US006823495B1

(12) United States Patent
Vedula et al.

(10) Patent No.: US 6,823,495 B1
(45) Date of Patent: Nov. 23, 2004

(54) MAPPING TOOL GRAPHICAL USER INTERFACE

(75) Inventors: Nagender P. Vedula, Bothell, WA (US); Aditya G. Bhandarkar, Bellevue, WA (US); Dharma K. Shukla, Bellevue, WA (US); William R. Taylor, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 521 days.

(21) Appl. No.: 09/662,396

(22) Filed: Sep. 14, 2000

(51) Int. Cl.[7] .............................. G09G 5/00; G06F 9/44

(52) U.S. Cl. ....................... 715/805; 715/853; 715/810; 715/763; 717/109; 717/125; 719/329

(58) Field of Search ................................. 345/746, 763, 345/967, 853, 810, 823, 805; 717/109, 113, 102, 105, 136, 162, 124, 125; 707/4; 719/329

(56) References Cited

U.S. PATENT DOCUMENTS

| 5,629,846 | A | | 5/1997 | Crapo |
| 5,808,615 | A | | 9/1998 | Hill et al. |
| 6,216,131 | B1 | * | 4/2001 | Kahn et al. |
| 6,334,158 | B1 | * | 12/2001 | Ginter et al. |
| 6,356,901 | B1 | * | 3/2002 | Kiernan et al. |
| 6,564,368 | B1 | * | 5/2003 | House et al. |

OTHER PUBLICATIONS

Acrobat Reader. Adobe Systems Incorporated. Copyright 1987–1999.*
Rubenking, Neil J. Delphi For Dummies. IDG Books. Foster City, CA. 1997. pp 9–24, 329–342.*

* cited by examiner

Primary Examiner—Raymond J. Bayerl
Assistant Examiner—Blaine Basom
(74) Attorney, Agent, or Firm—Amin & Turocy, LLP

(57) ABSTRACT

A graphical user interface and method for creating a mapping between a source object and a destination or target object are provided. The user interface includes a source screen region which displays a graphical representation of a source object, a target screen region which displays a graphical representation of a target object, and a mapping screen region which allows a user to create a mapping between the graphical representation of the source object and the graphical representation of the target object using graphical mapping indicia. The methodology includes displaying a graphical representation of a source object in a source screen region, displaying a graphical representation of a target object in a target screen region, creating a mapping between the graphical representation of the source object and the graphical representation of the target object in a mapping screen region using graphical mapping indicia, and displaying the mapping in the mapping screen region. The source and target objects may be schemas, spreadsheets, documents, databases, or other information sources, and the graphical mapping indicia may include link indicia and/or function objects linking nodes in the target object with nodes in the source object. The mapping may be compiled into code used by a runtime engine to translate source documents into target documents.

47 Claims, 35 Drawing Sheets

| Properties | Values | Output |
|---|---|---|

Source Attributes

| Property | Value |
|---|---|
| Name | RECORD1 |
| Description | |
| Type | Element |
| Model | Closed |
| Content | Element Only |
| Min Occurs | |
| Max Occurs | |

◄— 34

Destination Attributes

| Property | Value |
|---|---|
| Name | RECORD2 |
| Description | |
| Type | Element |
| Model | Closed |
| Content | Element Only |
| Min Occurs | |
| Max Occurs | |

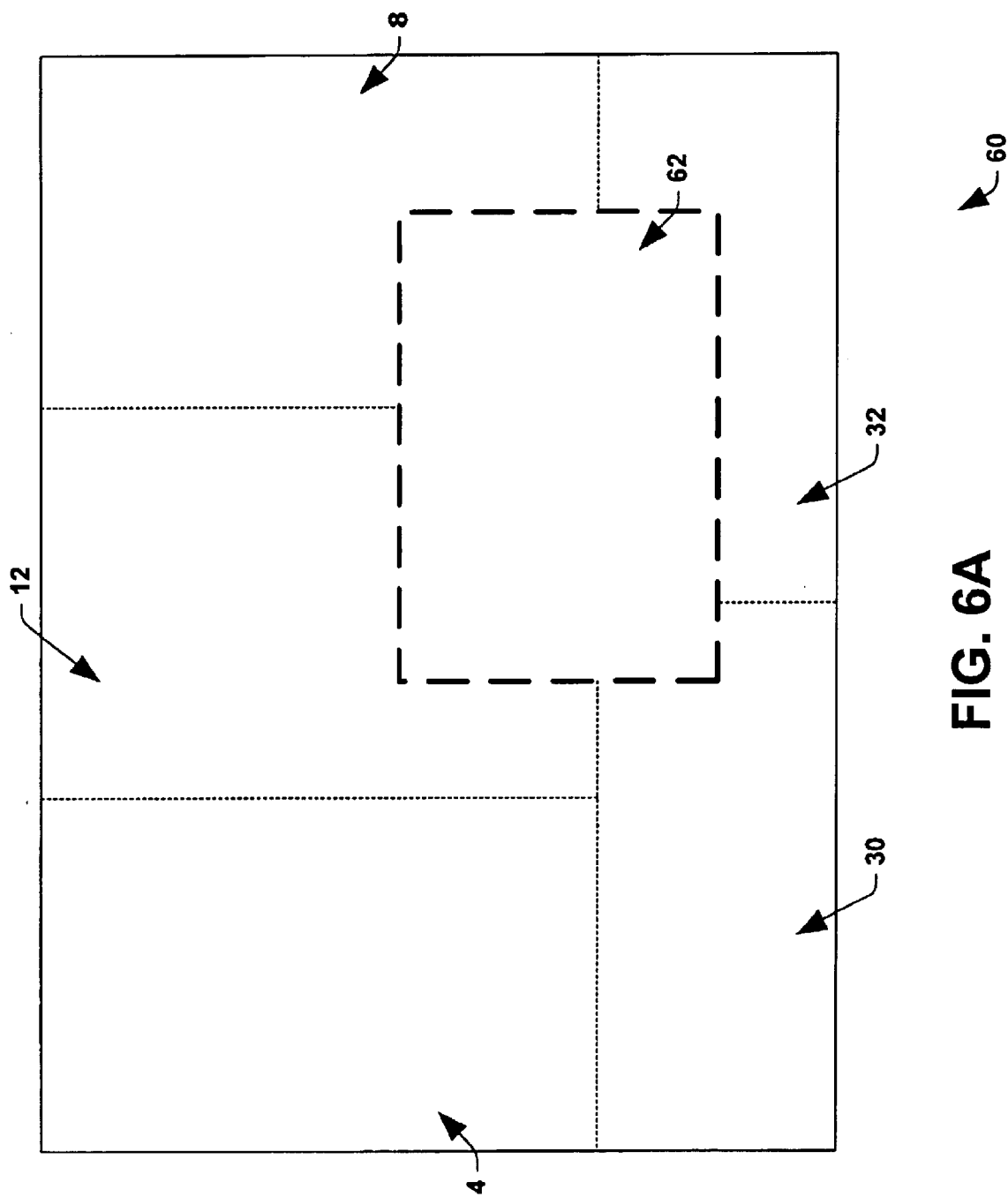

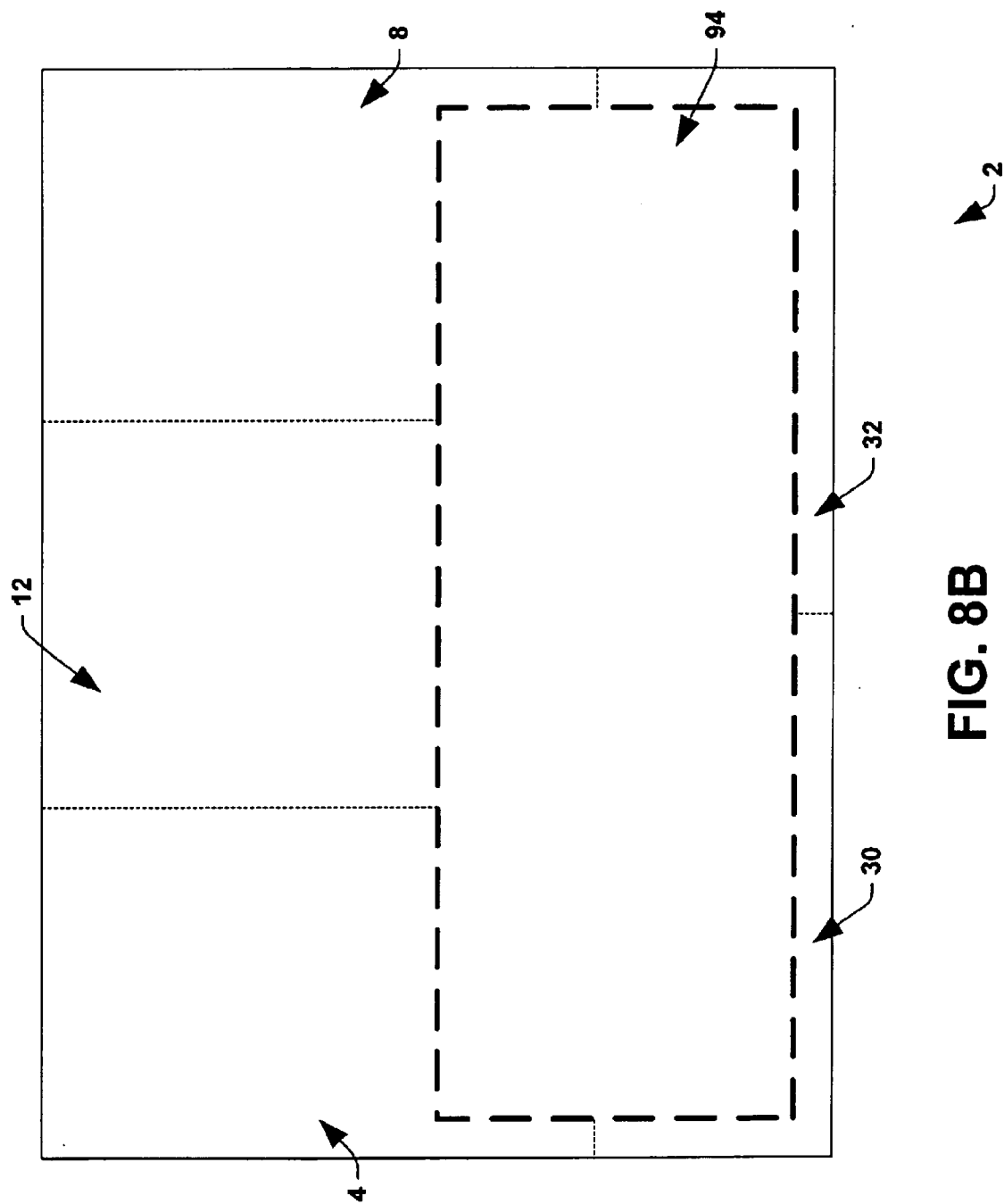

MAPPING TOOL GRAPHICAL USER INTERFACE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The present invention relates to mapping a source object with a target object. More particularly, the invention relates to a graphical user interface and methods for defining a mapping between a source object and a target object in a mapping tool.

BACKGROUND OF THE INVENTION

The Internet is enabling businesses to develop new ways to facilitate efficient and automated interactions between their own internal line of business, productivity and knowledge management applications, the applications used by their customers and trading partners, and services provided by their commercial and corporate providers. The challenges associated with enabling such efficient and automated interactions between applications across business boundaries in a cost effective manner are similar to those associated with enabling them within an enterprise or departmental boundary. Building business-to-business (B2B) e-commerce systems presents many challenges to the system architect. Often, each company involved stores their data and documents in formats that are different from the formats used by the other participating companies. These companies need a way to integrate what tend to be vastly different systems. In addition, Internet security issues are involved in business to business data interchange. Thus, several challenges are faced by businesses, governments, and other entities wishing to interact via electronic documents and other forms of electronic commerce.

The challenges to interaction across business boundaries include lack of a sufficiently flexible and rich universal language to specify, package, publish, and exchange both structured and unstructured information across application or business boundaries, lack of a flexible and rich universal language to specify, package, publish, and execute transformation rules to convert information from one format to the other as application and business boundaries are crossed, and lack of middleware-neutral application level communication protocols to enable automated interactions across application or business boundaries. The eXtensible Markup Language (XML), and XML-based schema languages enable businesses and other users to describe and exchange structured information between collaborating applications or business partners in a platform and middleware neutral manner.

Domain specific standards bodies and industry initiatives have started to adopt XML and XML-based schema languages to specify both their vocabularies and content models. These schemas are becoming widely published and implemented to facilitate communication between both applications and businesses. Wide support of XML has also resulted in independent solution providers developing solutions that enable the exchange of XML-based information with other external third party or custom developed applications. Several solution or middleware/platform specific approaches have been taken to address the lack of middleware-neutral application level communication protocols.

However, no single proprietary solution or middleware platform meets all the needs of a complex deployment environment. In addition, the cost and complexity of integrating together ERP systems, inventory management systems, or sales tracking systems within a single organization strains the capabilities of most large and small companies alike. In the near future, electronic commerce is going to require massive amounts of application integration across multiple organizations, as trading partners turn to the Internet to automate supply chains, forecasting systems, and government services, and new types of business interchanges.

Although XML provides a standardized format for document definition, conventional development tools require system developers to create code for mapping individual source document schemas with target schemas in order to facilitate the interchange of information between business organizations or entities. In a typical example, two companies may create schemas for their documents in XML. Where these companies want to exchange information via internal documents, an XML schema is created for documents at each company, and a system developer generates code for mapping information transfer between the source and target document schemas. Such mapping code may be developed in a language such as eXtensible Stylesheet Language (XSL). A developer may thus create an XSL style sheet representation of a mapping between source and target schemas.

An XSL style sheet is a form of mapping which includes a template of the desired target structure, and identifies data in the source document to insert into this template. This model for merging data and templates is referred to as the template-driven model and works well on regular and repetitive data. XSL also provides capabilities for handling highly irregular and recursive data such as is typical in documents. Template fragments are defined, and the XSL processor combines the results of these fragments into a final result tree based on the shape of the source data. Each template fragment declares the type and context of source nodes it is appropriate for, allowing the XSL processor to match source nodes with template fragments. This model is known as the data-driven model since the shape of the data drives the shape of the final output. An XSL transformation process is thus independent of any particular output grammar and can be used for translating XML data from one schema (source) to another (target).

Heretofore, system developers have provided code defining the interrelationships between XML business documents, based on the desired information to be exchanged via electronic commerce applications. However, for each source and target document set, code must be written mapping the relationships therebetween. Whether the code representing such a mapping is written in XSL or another language, writing this code is difficult and typically beyond the capabilities of ordinary business personnel. Conventional tools require a user to program document schema mappings using specialized, often proprietary, programming languages. The complexity of such programming languages and the learning curve associated therewith has heretofore discouraged average business personnel from attempting to create document mappings without the aid of experienced programmers. Improved tools are thus desirable to enable business personnel to define document mappings for business to business applications, as well as to generate mapping code, which do not require extensive knowledge of software programming.

SUMMARY OF THE INVENTION

The present invention provides a graphical user interface and method for creating a mapping between a source object (e.g., representing an XML business document by an XML schema) and a destination or target object (e.g., representing an XML business document by an XML schema) using graphical mapping indicia which minimize or overcome the above mentioned shortcomings of conventional methodologies. The source and target objects may be schemas, spreadsheets, documents, databases, or other information sources, and the graphical mapping indicia may include link indicia and/or function objects linking nodes in the target object with nodes in the source object. The mapping may be compiled into code used by a runtime engine to translate source documents into target documents, for example, in business to business information exchange applications.

The mapper user interface enables a user to graphically construct a translation mapping between a source schema and a destination (target) schema. This provides significant advantages over existing tools and methods which required a user to generate translational script or code. By providing a graphical environment for the creation of translation mappings, business personnel may efficiently generate document mappings without extensive knowledge of programming languages or the assistance of programmers. The user interface itself provides separate display regions or zones for the source and destination objects, which may be graphically presented as tree structures, with a mapping (grid) region in between.

The invention further provides the use of function objects or functoids in the mapping region, which may be connected between source and destination tree nodes to provide the desired translation functionality. Compiler interaction is provided which allows a user to compile a mapping from the interface. Compiler links and errors are graphically indicated in the mapping region, and the user may adjust compiler directives graphically. The invention also provides for simulation or testing of compiled document translation mappings.

The user interface provides the ability to link source tree nodes with destination tree nodes through direct links and/or functoid links, wherein the links are graphically represented as lines in the mapping or grid region of the display. Such links may be created using mouse movements and button clicks, and existing links may be moved. In addition, link properties may be modified via the user interface, for example, to change compiler options. In addition, properties associated with the tree nodes may be modified via the user interface. The interface also indicates partial links via dashed green lines, where a user has collapsed a node in one of the trees.

The mapping region of the user interface provides a functoid palette whereby a user may view available functoid icons which may be placed anywhere in the mapping or grid region using a drag and drop mechanism. The functoid palette includes several categories of functoid groupings, such as String, Mathematical, Logical, Date, Conversion, Scientific, and Advanced. The functoids in the grid may be moved, deleted, modified, and connected to tree nodes or other functiods using a mouse. Functoid properties are viewable and editable via pop-up pages or windows displaying the input parameters and script associated with a selected functoid. User-defined functoids are available to users wishing to create custom mapping functionality by writing script. The script may be, for example, visual basic script, visual C++, java script, or any ActiveX scripting language. The interface allows the creation of the functoid script, as well as the editing of the parameters and script associated with existing functiods.

The interface also allows a user to view and edit links generated by the mapping compiler. Dashed lines in the mapping region indicate compiler links immediately following compilation, and compiler warning messages and output code are displayed via a pop-up window. The links may be modified by the user in order to change compiler directives. The user-modifications are then used in subsequent compilations of a mapping.

The interface further provides replacement of the source and/or destination schema trees. This allows a user to correct or modify a previously created schema tree using an editor tool, and to reinsert the modified tree into a mapping without destroying the existing links in the mapping. The user interface re-establishes the links where possible, according to node name recognition or other considerations, and provides indications to the user of links which could not be re-established. In addition, the user interface allows the use of various data sources as source or destination schemas, such as documents, spreadsheets, databases, and other information sources. Translations are provided, whereby the mapper tool user interface generates a tree representation of such information sources for the creation of a mapping therebetween.

The interface also provides testing or simulation capabilities. A destination document instance may thus be created and displayed by the interface according to a sample source schema document and the translation map. Based on the output destination document, the user can modify the document translation mapping by modifying links, adding functoids, etc. In this regard, the user may associate constant values with source tree nodes, which are then used by the user interface in generating the sample destination document.

In accordance with one aspect of the present invention, there is provided a mapping tool graphical user interface, comprising a source screen region adapted to display a graphical representation of a source object, a target screen region adapted to display a graphical representation of a target object, and a mapping screen region adapted to allow a user to create a mapping between the graphical representation of the source object and the graphical representation of the target object using graphical mapping indicia. The source and target objects may be schemas, spreadsheets, documents, databases, or other information sources, and the graphical mapping indicia may include link indicia and/or function objects linking nodes in the target object with nodes in the source object.

According to another aspect of the invention, the source and target objects may include root nodes, record nodes, and field nodes. The field nodes may be indented in hierarchical fashion from the record nodes, and the record nodes are indented in hierarchical fashion from the root nodes. In addition, the mapping screen region may be located between the source and target screen regions, wherein the indentation of field and record nodes in the source and target screen regions is toward the mapping screen region. This provides an easy to use interface, wherein the hierarchical indentation of the source and target trees provides optimal access to tree nodes from the mapping screen region using a mouse or other user interface selection device.

According to another aspect of the invention, a mapping tool graphical user interface is provided which includes a source screen region adapted to display a graphical representation of a source object, a target screen region adapted to display a graphical representation of a target object, a mapping screen region adapted to allow a user to create a mapping between the graphical representation of the source object and the graphical representation of the target object using graphical mapping indicia, and a graphical compiler object adapted to allow the user to generate compiled mapping output code using a compiler. The mapping screen region may include compiler link indicia associated with links generated by the compiler, appearing as dashed lines in the mapping screen region. A user may select the compiler link indicia and move the compiler link indicia to another source or target, for example, using a mouse. In addition, an output code screen may be provided in another region of the user interface, which displays the output code generated by the compiler and compiler warnings.

According to yet another aspect of the invention, there is provided a mapping tool graphical user interface, comprising a source screen region adapted to display a graphical representation of a source object having a source node, a target screen region adapted to display a graphical representation of a target object having a target node, and a mapping screen region adapted to allow a user to create a mapping between the graphical representation of the source object and the graphical representation of the target object using graphical mapping indicia with a graphical link indicia adapted to associate the target node with the source node. The graphical link indicia may be a solid line in the mapping screen region between source and target tree nodes and/or function objects. The links may be selected, modified, and/or moved, for example, using a mouse. In addition, compiler directives and other properties associated with the links may be modified by the user.

According to another aspect of the invention, the graphical mapping indicia comprises a function object or functiod adapted to associate a target node a source node. The function object may be associated with script used by a compiler to generate compiled mapping output code. A function object palette may be provided in a palette region including a plurality of function objects, which allows a user to drag and drop a function object from the function object palette onto the mapping screen region using a user interface selection device such as a mouse. Thereafter, the function objects may be selected, moved, deleted, and properties associated therewith may be modified. Function objects may be selected individually or in groups, and selection indicia may indicate the function objects so selected. User-defined function objects may be created via the interface, and the script associated with function objects may be modified or customized.

According to another aspect of the invention, one or more scrolling indicia may be provided in the mapping screen region adapted to allow the user to selectively display portions of the mapping in the mapping screen region. This allows a user to create a large complex mapping, a portion of which is displayed in the mapping screen region. The scrolling indicia is displayed near an outer perimeter of the mapping region when the user moves a user interface selection device near the outer perimeter. The scrolling indicia indicates a direction in which scrolling is possible, and the mapping screen region may scroll the mapping display in the direction indicated by the scrolling indicia when the user selects the scrolling indicia using the user interface selection device.

The user interface may further include a mapping preview page in a mapping preview page region adapted to display the entire mapping. This allows a user to effectively zoom out to see an overview of the mapping. The mapping preview page further comprises a current region indicia adapted to indicate the portion of the mapping currently displayed in the mapping screen region. The user may move the current region indicia within the mapping preview page region, to thereby change the portion of the mapping currently displayed in the mapping screen region.

According to still another aspect of the invention, the user interface may also include a test screen region adapted to display a test target object instance according to the mapping. The test screen region may further comprises a test value page adapted to allow a user to associate a constant value with a node in one of the source object and the target object, and a test output window adapted to display the test target object instance. This allows the user to simulate document translations according to the current mapping in the mapping region.

According to yet another aspect of the invention, the user interface is adapted to allow a user to replace one of the source and target objects, and to preserve at least a portion of the mapping. Consequently, a user may correct a source or target schema error discovered while creating a mapping, and insert the revised source or target schema, while maintaining as many mapping links as possible.

In accordance with another aspect of the invention, there is provided a method of creating a mapping in a mapper graphical user interface. The method comprises displaying a graphical representation of a source object in a source screen region, displaying a graphical representation of a target object in a target screen region, creating a mapping between the graphical representation of the source object and the graphical representation of the target object in a mapping screen region using graphical mapping indicia, and displaying the mapping in the mapping screen region. In addition, the invention comprises a computer-readable medium with computer-executable instructions for implementing the methodology of the invention.

To the accomplishment of the foregoing and related ends, certain illustrative aspects of the present invention are hereinafter described with reference to the attached drawing figures. The following description and the annexed drawings set forth in detail certain illustrative applications and aspects of the invention. However, the illustrations and description are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

The foregoing and other aspects of the invention will become apparent from the following detailed description of the invention and the attached drawings in which:

FIG. 3C is a front elevation view illustrating a source properties page and a target properties page according to the invention;

FIG. 6A is a front elevation view illustrating another exemplary user interface having a function object palette screen region according to the invention;

FIG. 8B is a front elevation view illustrating another exemplary user interface having an output screen region according to the invention;

DETAILED DESCRIPTION OF THE INVENTION

Figure 1:
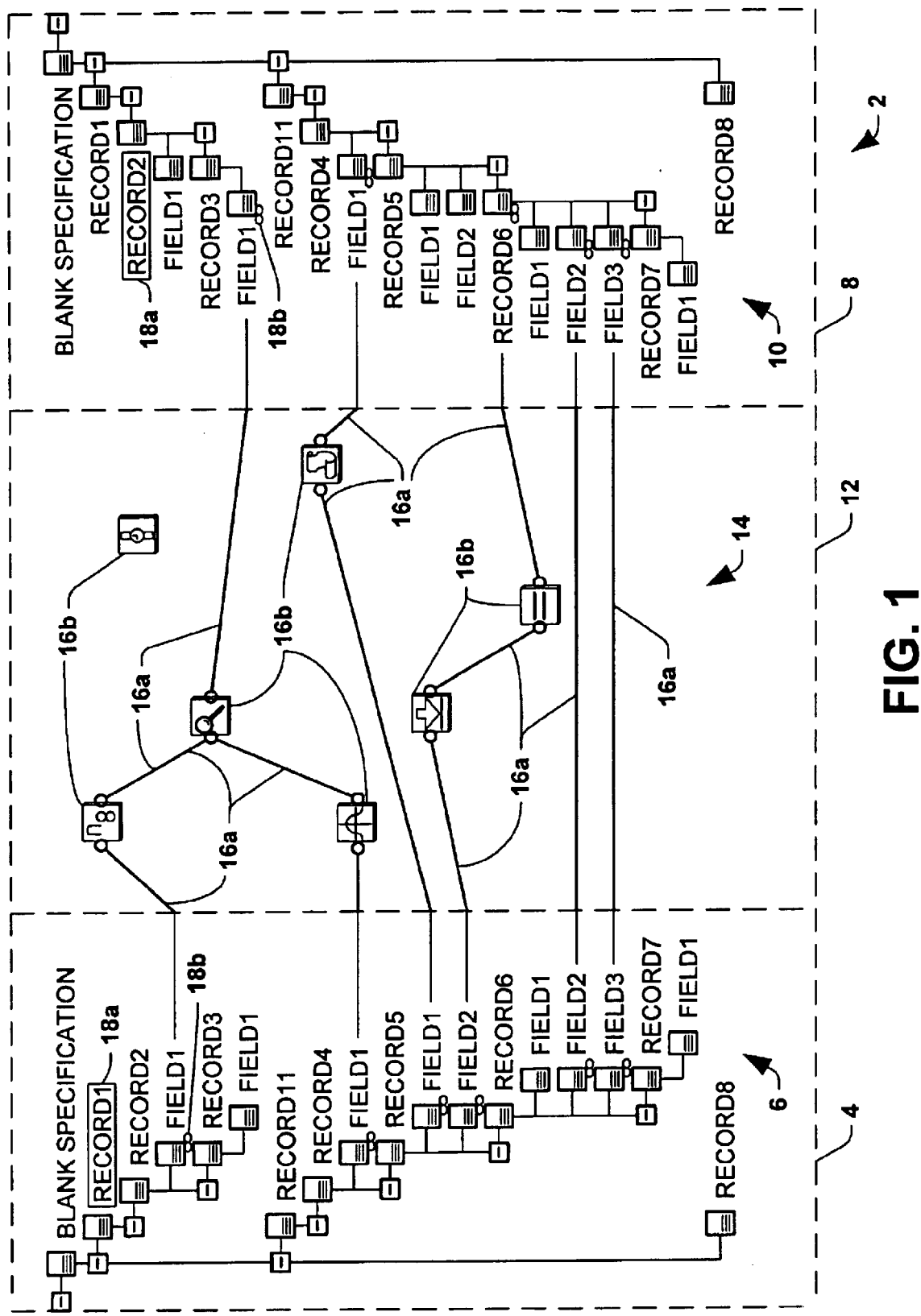
FIG. 1 is a front elevation view of an exemplary graphical user interface having a source screen region, a target screen region, and a mapping screen region for creating a mapping between a source object and a target object in accordance with an aspect of the invention.

The following is a detailed description of the present invention made in conjunction with the attached figures, wherein like reference numerals will refer to like elements throughout. According to one aspect of the invention, a method and graphical user interface are provided for creating a mapping between two objects, which may be compiled into output code for use in translating source document information into destination or target document information. The invention thus advantageously allows an unsophisticated to define translational mapping relationships between business documents used across business and/or application boundaries, and to generate code capable of handling the information transfers therebetween, without having extensive knowledge of computer programming languages.

While some of the implementations and aspects of the invention are illustrated and described hereinafter with respect to source and target objects which are XML schemas, the invention finds application with any type of source or target objects including, for example, schemas, databases, spreadsheets, documents, and the like. It will further be appreciated that the invention further contemplates a computer-readable storage medium having computer-executable instructions for creating a mapping in a graphical user interface.

Referring now to the drawings, FIG. 1 illustrates an exemplary graphical user interface 2 having a source screen region 4 adapted to display a graphical representation of a source object 6, a target screen region 8 adapted to display a graphical representation of a destination or target object 10, and a mapping screen region 12 for creating a mapping 14 between the source object 6 and the target object 10 in accordance with an aspect of the invention. The mapping 14 is created by a user via the interconnection of nodes (not numerically designated) in the source and target objects 6, 10, using graphical mapping indicia (collectively 16).

The graphical mapping indicia 16 comprises links 16a and function objects or functoids 16b in the mapping screen region 12, as illustrated and described in greater detail hereinafter. The object nodes may include root nodes, record nodes, and field nodes, which may be graphically represented in a hierarchical tree structure as described further hereinafter. The user interface 2 further comprises one or more selection indicia 18a graphically indicating that a node in the source or target objects 6 and/or 10 has been selected in regions 4 and/or 8, respectively, as well as connection indicia 18b in the regions 4 and/or 8 graphically indicating that a node in the source and/or target objects 6 and/or 10 is connected or linked to another entity via the mapping 14.

The source and target objects 6 and 10, respectively, may comprise XML or other schemas, spreadsheets, documents, databases, and/or other information or data sources. The user interface 2 may accordingly be adapted to display the objects 6 and 10 in a hierarchical tree structure to allow for ease of mapping creation, as described in greater detail infra. In addition, once a mapping (e.g., mapping 14) has been created, a user may replace one or both of the source and target objects 6 and/or 10 with another information source/destination, while preserving at least a portion of the mapping 14 and associated links. The user interface 2 accordingly maintains links, where possible, using node name association and other techniques to re-establish links with the new object or objects. In this way, a user may modify one or both of the objects 6 and/or 10 using an editor tool or the like, and then re-insert the modified object into the user interface 2 without sacrificing mapping work product.

Figure 2:
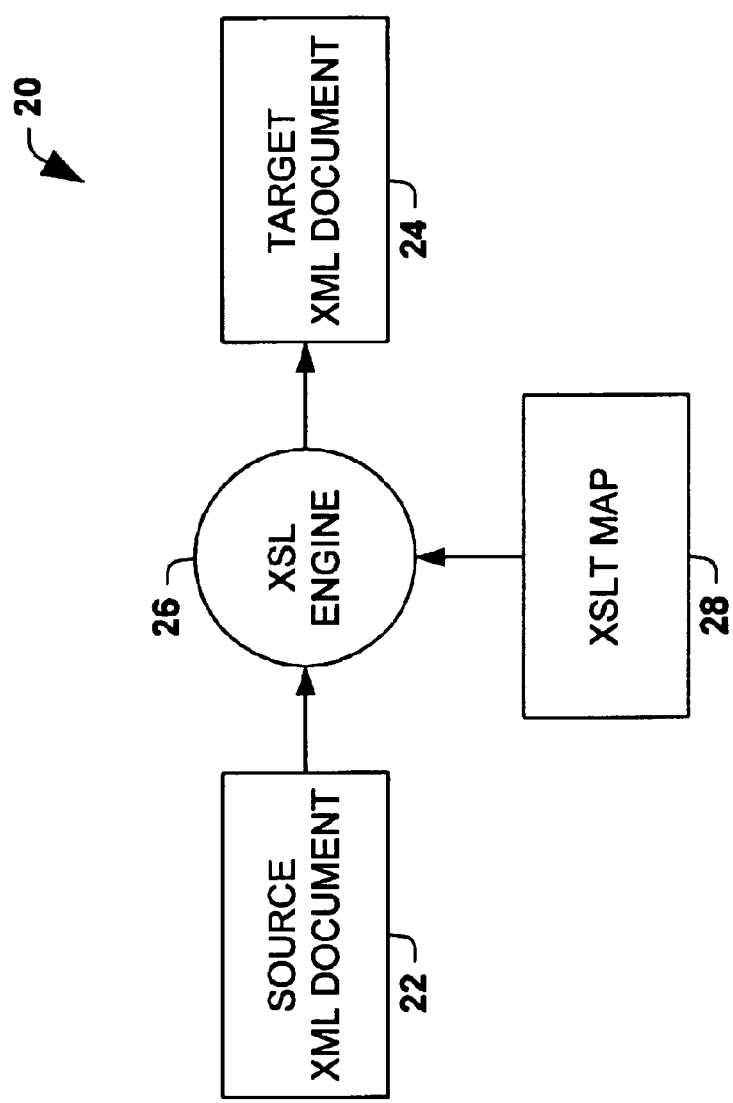
FIG. 2 is a schematic block diagram illustrating an XSL engine translating a source XML document into a target XML document according to an XSLT map created according to the invention.

Referring now to FIG. 2, an application of the invention is illustrated schematically, wherein a system 20 includes a source XML document 22, a target XML document 24, with an XSL engine 26 therebetween. The XSL engine 26 may comprise, for example, a computer system, which provides data transformations between the source XML document 22 and the target XML document 24 in accordance with an XSLT map 28 generated graphically in accordance with the invention. In this regard, the graphical user interface 2 of FIG. 1 may be used to create a mapping (not shown), which is then compiled into the computer executable instructions or codes, for example, XSLT code (e.g., map 28), and run by the engine 26 in performing the data transformation.

Figure 3A:
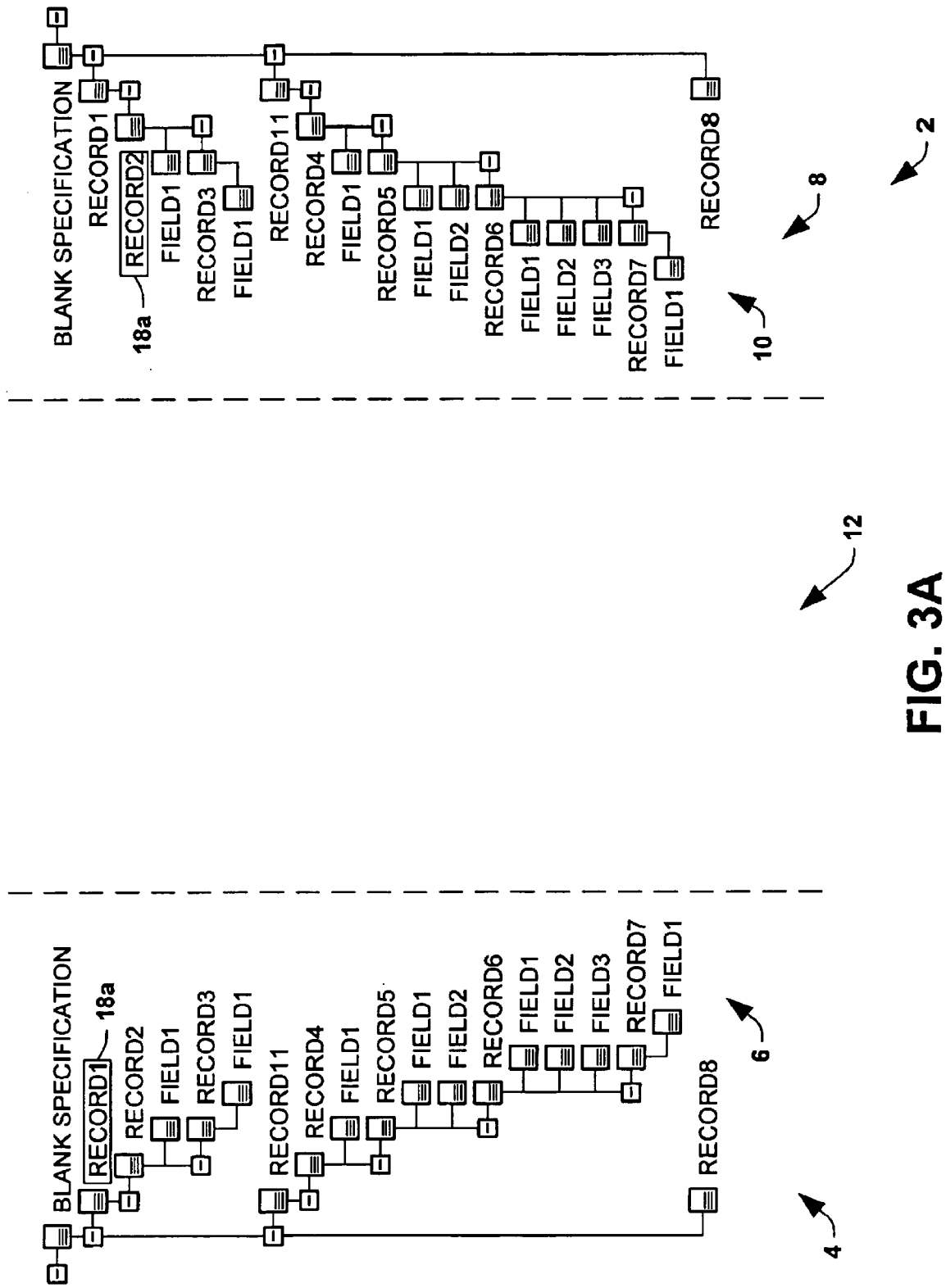
FIG. 3A is a front elevation view of another exemplary graphical user interface according to the invention.

Referring now to FIG. 3A, an exemplary mapping tool graphical user interface 2 is illustrated having a mapping screen region 12 located between source screen region 4 and target screen region 8. The mapping screen region 12 is adapted to allow a user to create a mapping (not shown) between a graphical representation of a source object in region 4 and a graphical representation of a target object in region 8. The graphical source and target object representations may be in the form of a tree structure as shown in FIG. 3A. The tree structure may further include a hierarchical format wherein field nodes in the tree are indented from record nodes in the tree, which are turn indented from root nodes in the tree. In the exemplary source object representation 6 in region 4, for example, a field node FIELD1 is indented from its immediate parent record node RECORD2. The record node RECORD2 is indented from its immediate parent record node RECORD1, which is in turn is indented from a root node BLANK SPECIFICATION. Similarly, in the target object representation 10 of region 8, a record node RECORD4 is indented from its immediate parent record node RECORD11, which in turn is indented from its parent root node BLANK SPECIFICATION. The graphical object representation 6 and 10 may include a mirrored form of indentation wherein the indentation is directed towards the mapping screen region 12 lying between the source screen region 4 and the target screen region 8. Thus, the target object representation 10 is laterally inverted with respect to that of the source tree representation 6. The mapping screen region 12 may further include a grid (not shown) as described further hereinafter.

Figure 3B:
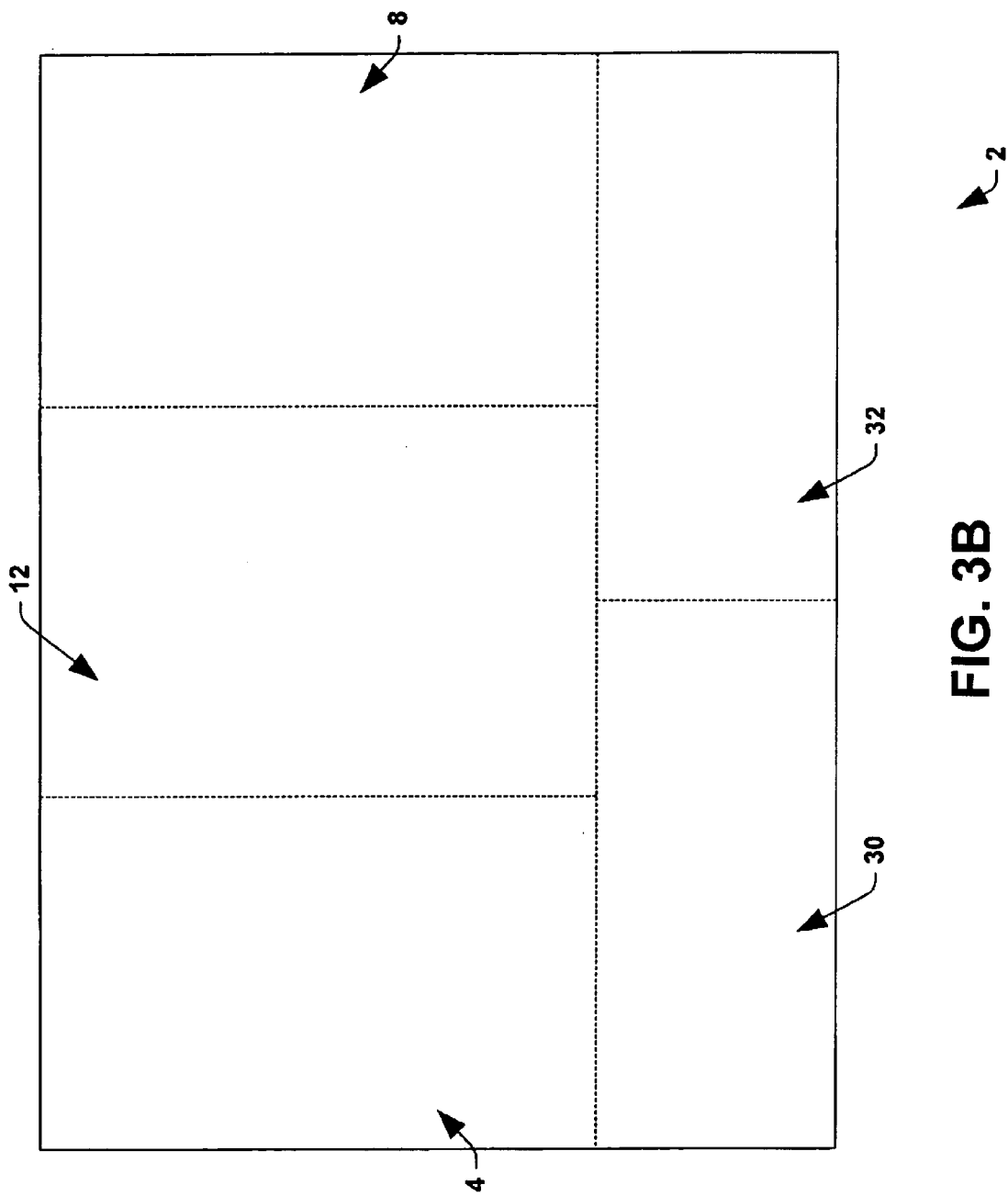
FIG. 3B is a front elevation view illustrating another exemplary user interface having node properties page regions according to the invention.

Referring also to FIG. 3B, the exemplary mapping tool user interface 2 may comprise source screen region 4, target screen region 8 and mapping screen region 12, as well as a source node properties page region 30 located below the source screen region 4, and a target node properties page screen region 32 located below the target screen region 8. The regions 30 and 32 may include node property information (not shown) associated with a node selected by the user in one or both of the source object tree 6 and the target object tree 10 as indicated via node selection indicia 18a.

Referring now to FIG. 3C, an exemplary source properties page 34 and a target properties page 36 may display such node property information in the regions 30 and 32, respectively. For example, when a user has selected record node RECORD1 in the source object tree 6 as indicated by the node selection indicia 18a in FIG. 3A, the source node properties page 34 may indicate the name, description, type, model, content, and other properties associated with the node RECORD1, as well as values therefore. Likewise, where a user selects a record node RECORD2 in the target object tree 10 as indicated by node selection indicia 18a, the target node properties page 36 in region 32 may indicate one or more properties associated with the selected target tree node. The selection of such nodes in the source and target object tree 6 and 10 may be accomplished by a user interface selection device (not shown) such as a mouse, cursor, and the like.

Figure 4B:
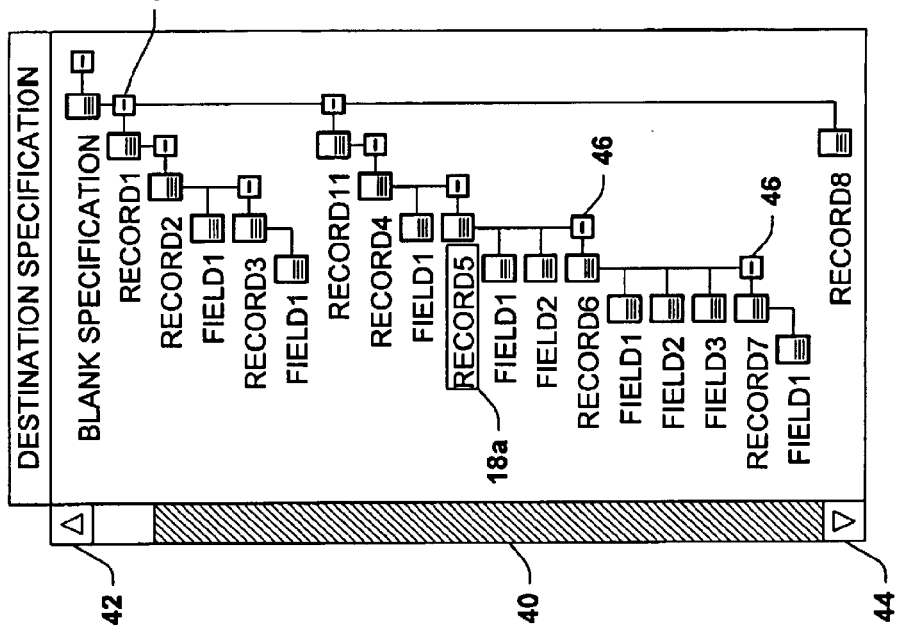
FIG. 4B is a front elevation view of an exemplary graphical representation of a target object according to an aspect of the invention.
Figure 4A:
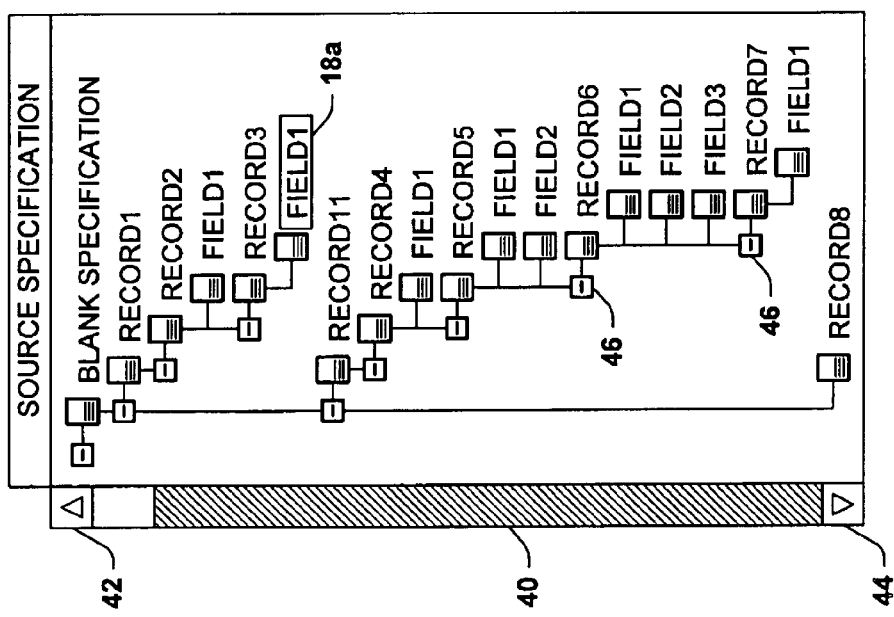
FIG. 4A is a front elevation view of an exemplary graphical representation of a source object according to an aspect of the invention.

Referring now to FIGS. 4A and 4B, an exemplary graphical representation of a source object 6 and an exemplary graphical representation of the target object 10 are illustrated. As described above, the representation 6 and 10 may be presented in an indented hierarchal tree form with field nodes indented from record nodes and record nodes indented from root nodes. As illustrated, the indentation in the source object tree 6 is to the right and the indentation in the target object 10 is to the left, for ease of creating links between nodes in the mapping screen region 12 of FIG. 3B. Scroll bars 40 and/or up and down scroll arrow actuator buttons 42 and 44 may be provided in the object tree 6 and 10, whereby a user may easily scroll the object trees up and down. For example, scroll bars 40 and/or buttons 42 and 44 may be selectively displayed in the regions 4 and/or 8 where a particular source or target object tree is larger than the corresponding screen regions 4 and/or 8. A user may further expand and/or collapse one or more branches of the hierarchical object tree using the collapse indicia 46.

Figure 5:
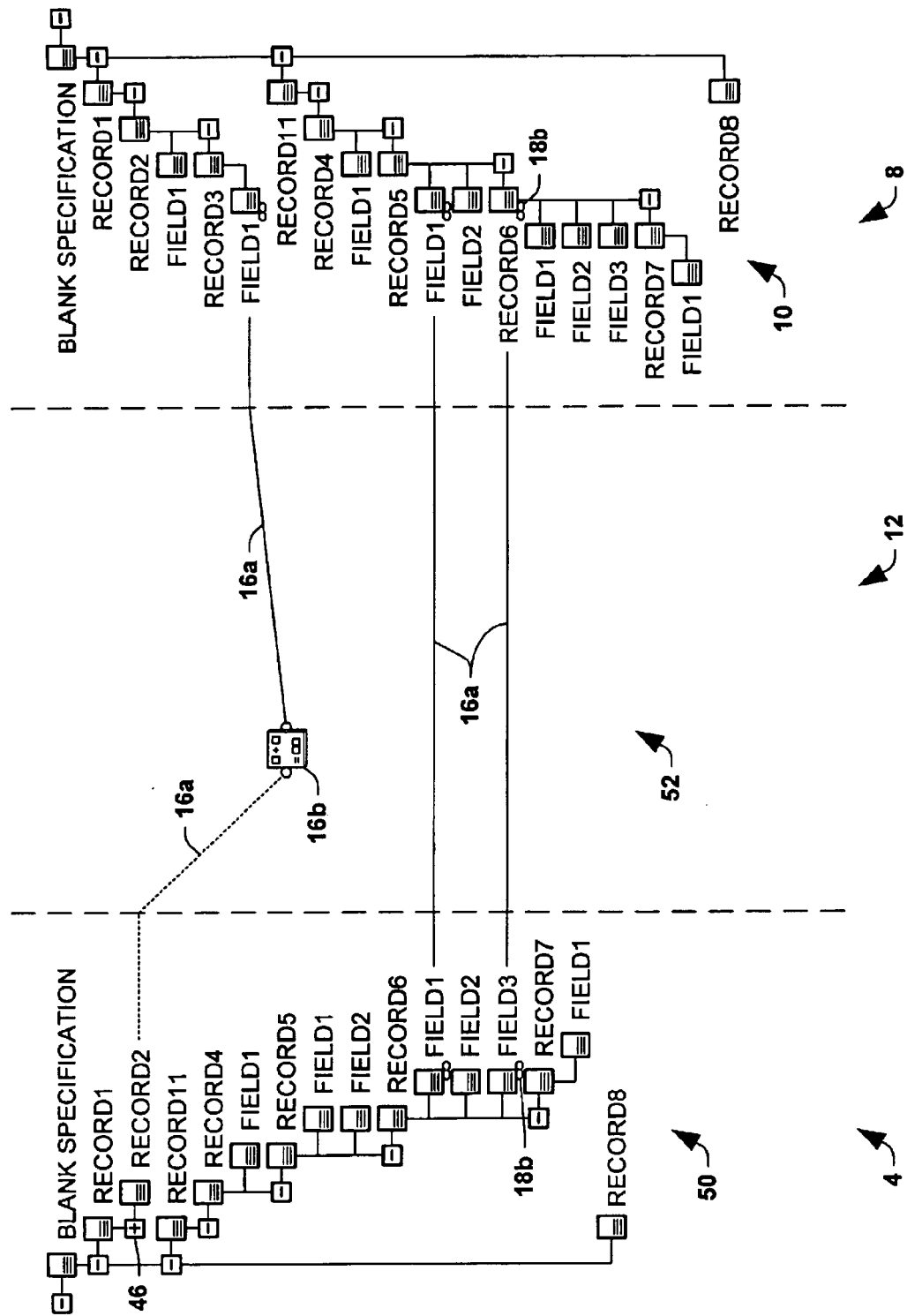
FIG. 5 is a front elevation view of another graphical user interface with an exemplary function object in a mapping screen region according to the invention.

Referring now to FIG. 5, another exemplary source object graphical representation 50 is illustrated in region 4, wherein the branch for record node RECORD2 has been collapsed using the collapse indicia 46. In constructing or creating a mapping 52 in the mapping screen region 12, the user graphically associates or connects nodes from the source object tree 50 to the target object tree 10 using graphical mapping indicia 16. These indicia may include link indicia 16a and/or function objects 16b. Such links 16a may be created by the user between 2 nodes, between a node and function object (e.g., function object 16b), and/or between 2 function objects, thus allowing cascading of the function objects 16b. Once created, such links 16a may be selected using a user interface selection device (e.g., mouse) and then moved, deleted, and/or modified whereby properties such as compiler directives associated therewith may be changed.

To construct a link 16a, a user selects or highlights a first object such as a node. For example, a user may select field node FIELD3 in the source object tree 50 using a user interface selection device (e.g., a mouse). The selection device may be moved to a second object such as record node RECORD6 of the target object tree 10. A link having thus been created, a link indicia 16a is displayed as a line in the mapping screen region 52 between the source object node FIELD3 and the target object node RECORD6. The connection of the nodes may be further indicated in the regions 4 and/or 8 via connection indicia 18b.

Where a link 16a has been thus created with respect to a node in a collapsed branch (e.g., record node RECORD2), the link 16a may be represented using a collapsed link indicia, such as a dashed line. In addition, the collapsed link indicia may be further displayed in a color different from other indicia in the graphical user interface mapping screen region 12, as described in greater detail hereinafter. Furthermore, the user interface may be adapted to allow the user to select the collapsed length indicia, whereby the collapsed node it is linked to (e.g., record node RECORD2) is expanded. Thereafter, the links to nodes in the expanded branch are indicated with non-collapsed link indicia (e.g., solid lines).

Once created, the links 16a may be moved, deleted, or modified by selecting the link 16a using a user interface selection device (not shown). The mapping screen region 12 in this regard may be further adapted to display a link selection indicia associated with the selected link to thereby indicate the selection. For example, the selected link 16a may be displayed in a color different from that of other non-selected links in the mapping screen region 12. As described further hereinafter, the selection of a link 16a may further actuate the display of a link property screen or page in a separate region of the user interface, whereby properties associated with the link may be modified. For example, compiler directives associated with the selected link may be modified in this fashion (e.g., flattening, top-down and bottom-up).

Figure 6B:
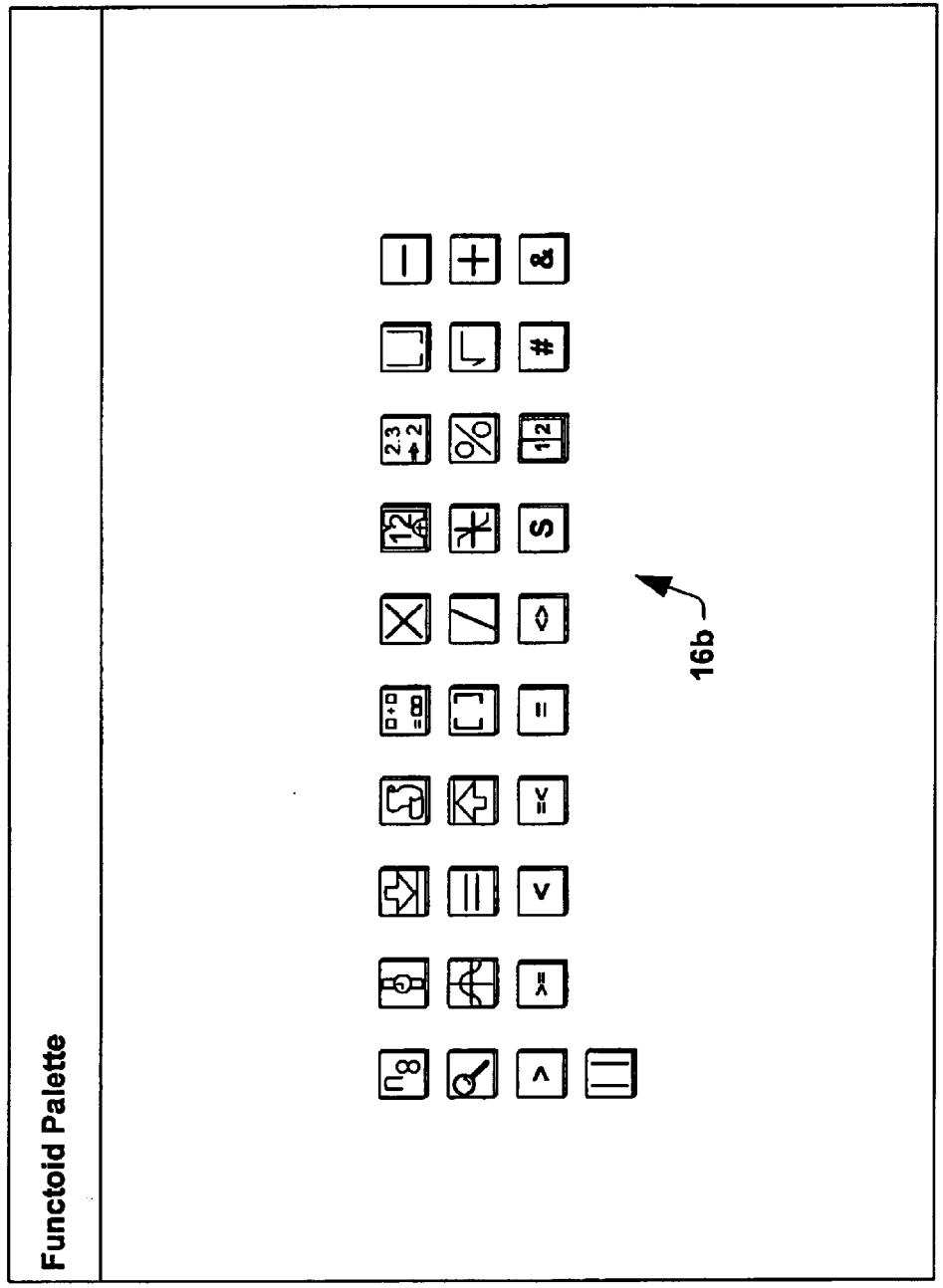
FIG. 6B is a front elevation view illustrating an exemplary function object palette screen according to the invention.

Referring now to FIGS. 6A-6D, another exemplary user interface 60 is illustrated having a function object pallet screen region 62. FIG. 6B illustrates an exemplary function object pallet screen 64 which may be displayed in the region 62. The pallet screen 64 comprises a plurality of function objects 16b which a user may utilize in the mapping screen region 12 of interface 60 by drag and drop methodology, whereby one or more function objects 16b may be placed by the user into the mapping screen region 12. Using the function objects 16b and/or the links 16a, a user may graphically create or define a mapping (e.g., mapping 14 and region 12 of FIG. 1) between a source object and a target object (e.g., source object 6 in region 4 and target object 10 in region 8 in FIG. 1). The user interface 60 according to the invention thus enables the user to graphically construct a translation mapping between a source object and a destination or target object. This provides significant advantages over existing tools and methods, which required a user to generate translational script or code. This graphical mapping creation environment allows business personnel to efficiently generate document mappings without extensive knowledge of programming languages or the assistance of programmers.

Figure 6C:
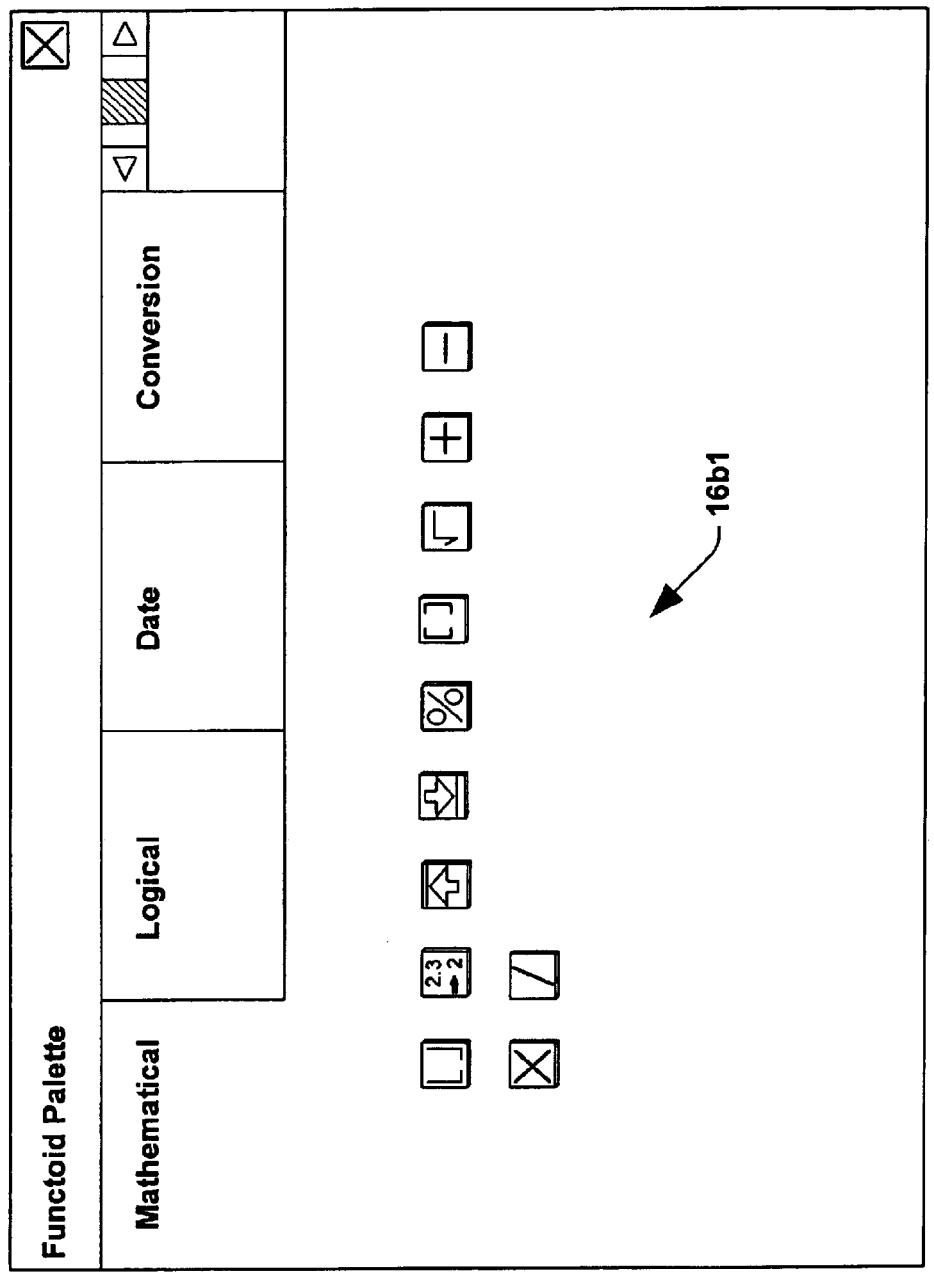
FIG. 6C is a front elevation view illustrating another exemplary function object palette screen according to the invention.
Figure 6D:
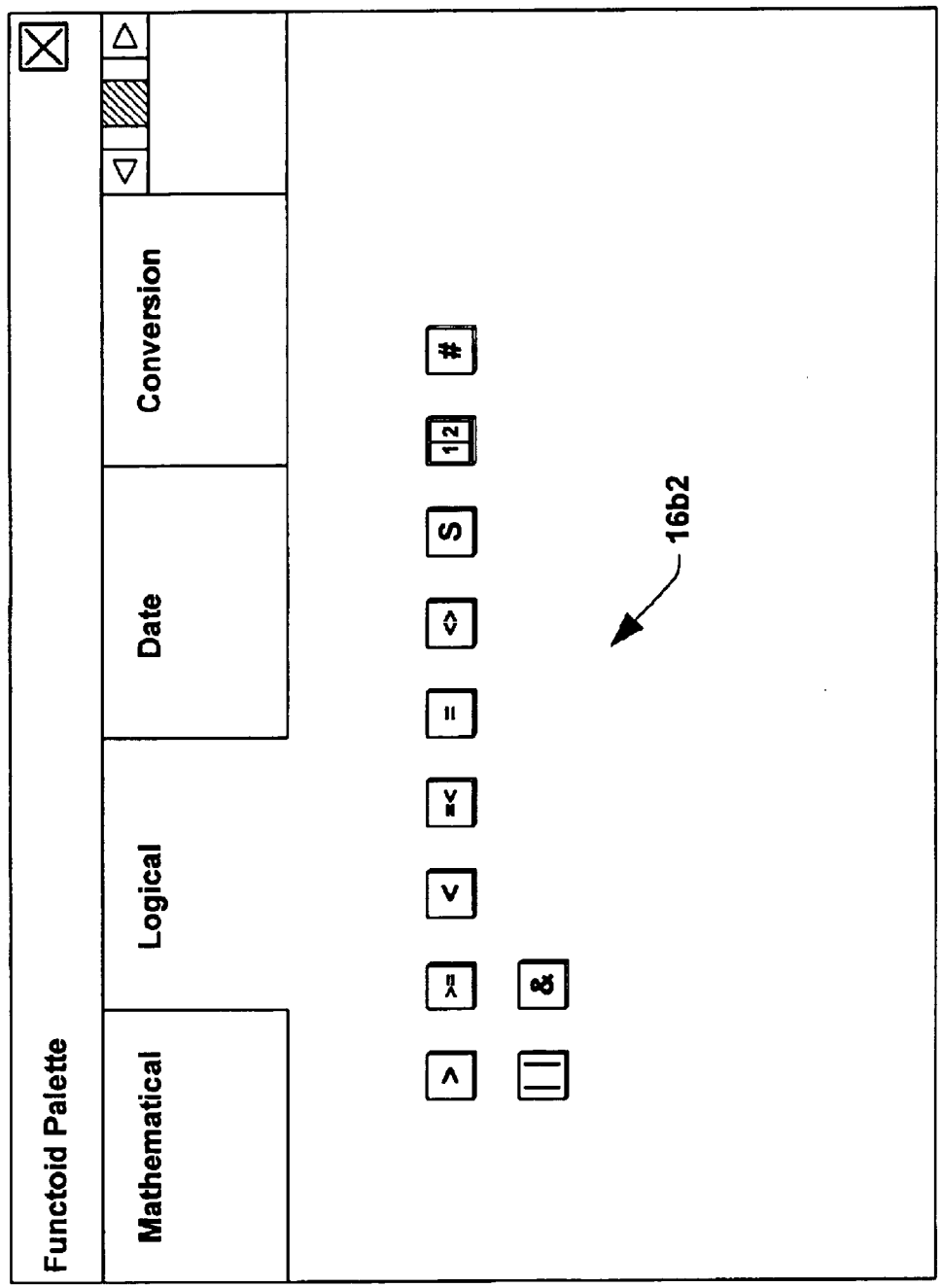
FIG. 6D is a front elevation view illustrating another exemplary function object palette screen according to the invention.

Referring also to FIGS. 6C and 6D, the function objects or functoids 16b may be presented to the user in grouped fashion. Such grouped functoids 16b may thus be presented to the user via a plurality of pallets, such as functiod pallet 66 of FIG. 6C and pallet 68 of FIG. 6D, where the groupings are according to the function type of the function objects 16b. For example, a mathematical function object pallet grouping 66 may be provided with one or more mathematical function objects 16b1, and a logical function object pallet 68 may be provided with logical function objects 16b2. It will be further appreciated in this regard that the user interface according to the invention may provide links (e.g., via the Internet) to other sources of function objects or functoids 16b, such as through a web page. The function object 16b, moreover, may have script or code associated therewith which may be used by a mapping compiler in generating output code associated with the mapping of mapping screen region 12.

Figure 7A:
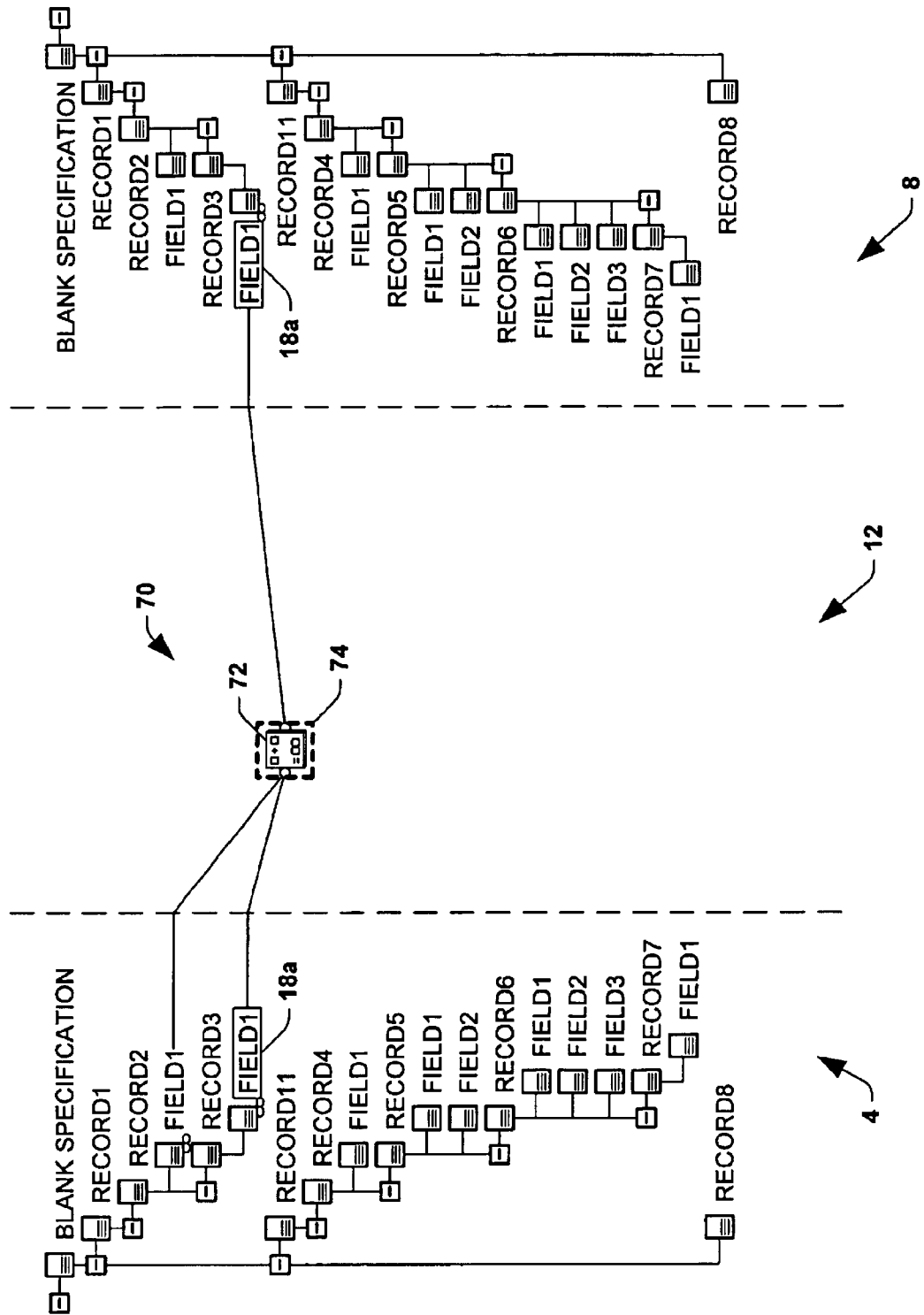
FIG. 7A is a front elevation view illustrating another exemplary user interface having a selected function object and a function object selection indicia according to the invention.

Referring now to FIG. 7A, an exemplary mapping 70 is illustrated in mapping screen region 12 having a function object 72 linked between two source object field nodes (not numerically designated) and one target object field node. A user has selected the function object 72, whereby a function object selection indicia 74 is displayed in the mapping screen region 12 to indicate that the function object 72 has been selected. The selection of the function object 72 may be accomplished via a user interface selection device (e.g., a mouse).

Figure 7B:
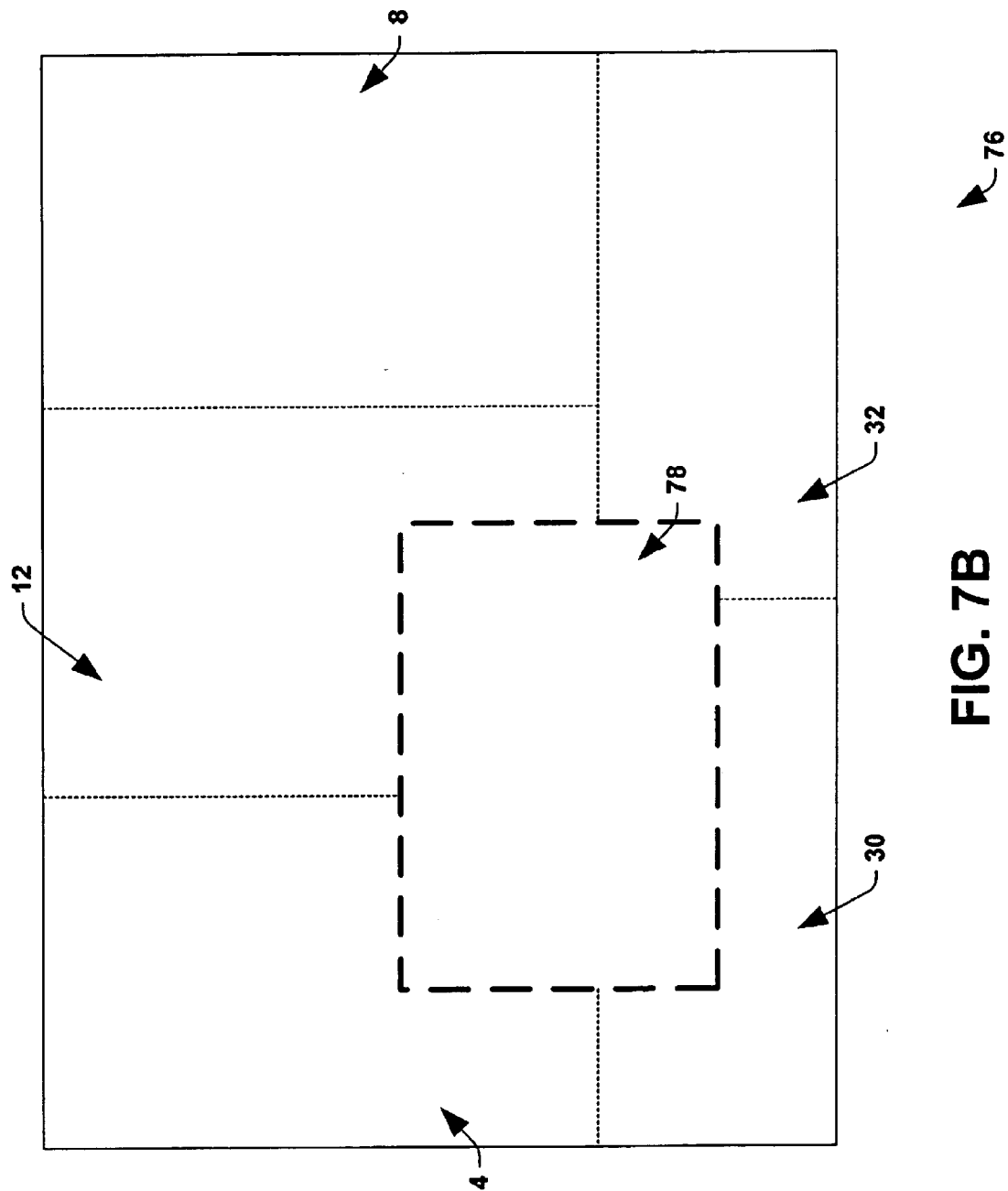
FIG. 7B is a front elevation view illustrating another exemplary user interface having a function object properties page screen region according to the invention.
Figure 7C:
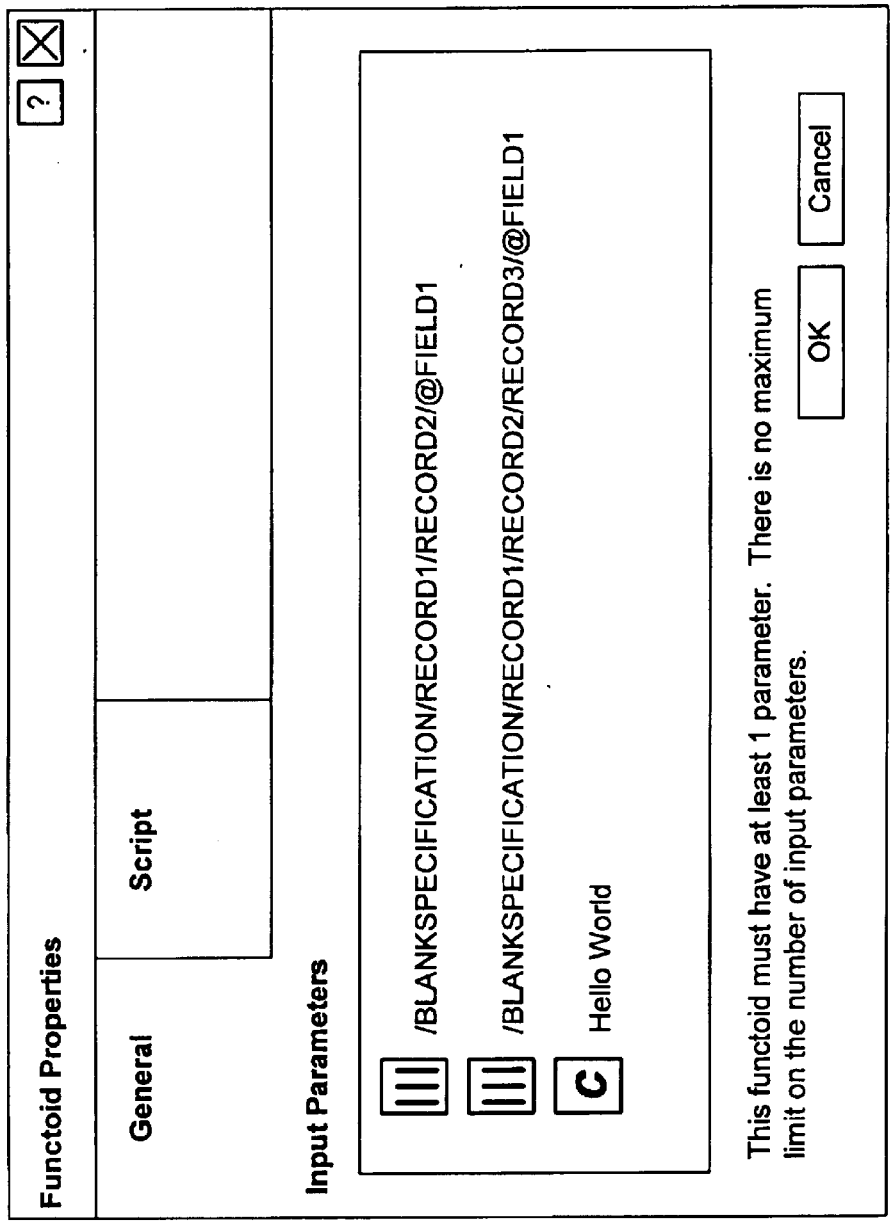
FIG. 7C is a front elevation view illustrating an exemplary function object properties page according to the invention.

Referring also to FIGS. 7B and 7C, a graphical user interface 76 may further include a function object properties page screen region 78 adapted to display properties associated with the selected function object 72 via a function object properties page 80. The function object properties page 80 displays parameters such as input parameters and a value. For example, the input parameters may indicate the links created between field nodes in the source screen region 4 and the function object 72, as illustrated graphically in FIG. 7A. A user may advantageously change the sequence and otherwise modify parameters associated with the function object 72 in the function object properties page 80 using a drag and drop mechanism via a user interface selection device. In addition, a user may embed a constant value in the function object properties page 80.

Figure 7D:
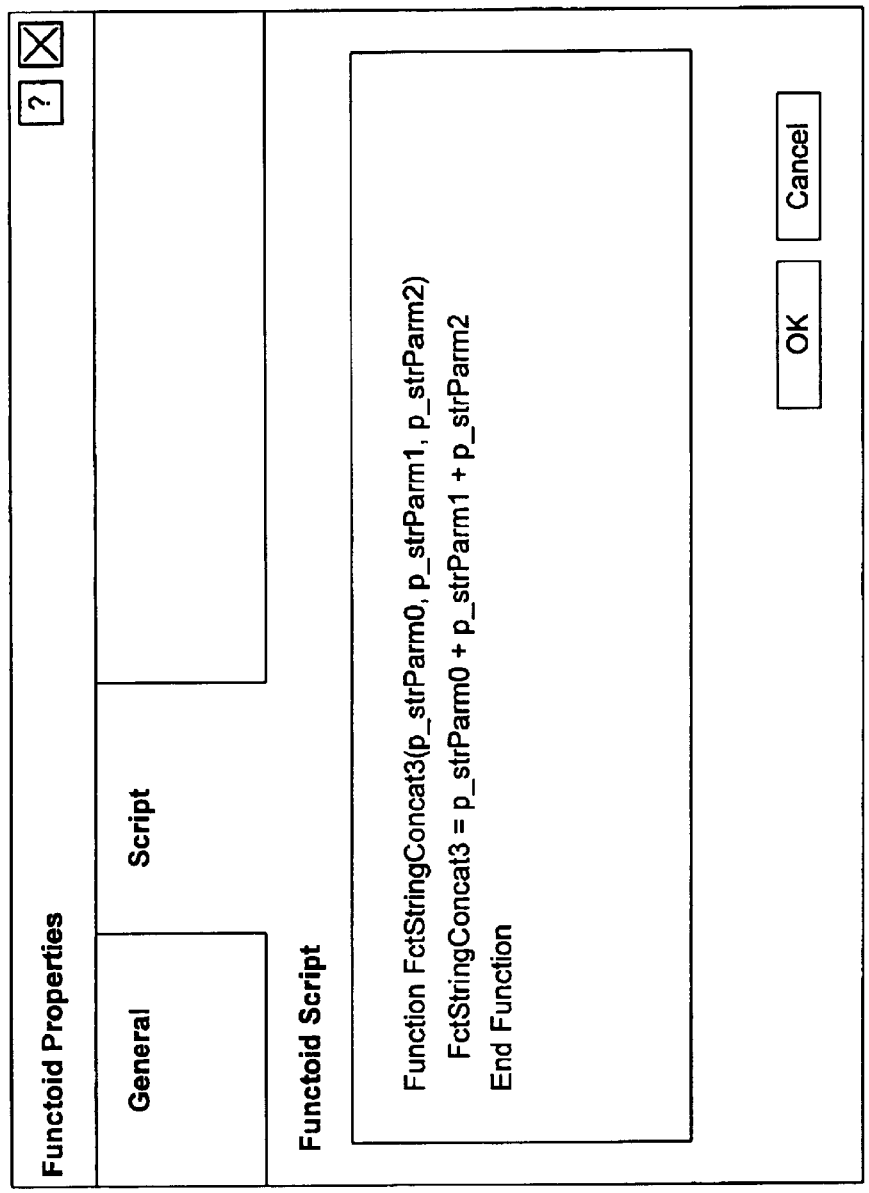
FIG. 7D is a front elevation view illustrating another exemplary function object properties page according to the invention.

Referring now to FIG. 7D, in addition to modifying parameters such as the input parameters associated with the function object 72, a user may modify script associated with the function object 72 via the function object properties page 80. In this regard, a function object creation interface 82 may be provided in region 78 as illustrated in FIG. 7D. The function object creation interface 82 is adapted to allow the user to create user script and to associate the user script with a user function object. This may be accomplished, for example, by editing an existing function object 72 via the creation interface 82. A compiler associated with the interface may embed the script displayed in the interface 82 into compiled output code for execution by a runtime engine (not shown) in translating source documents into target documents. While the exemplary function object script illustrated in FIG. 7D is shown in eXtensible Stylesheet Language (XSL), it will be appreciated that other code or script is possible within the scope of the invention including, for example, Java script, visual basic script, and other active X script.

Figure 8A:
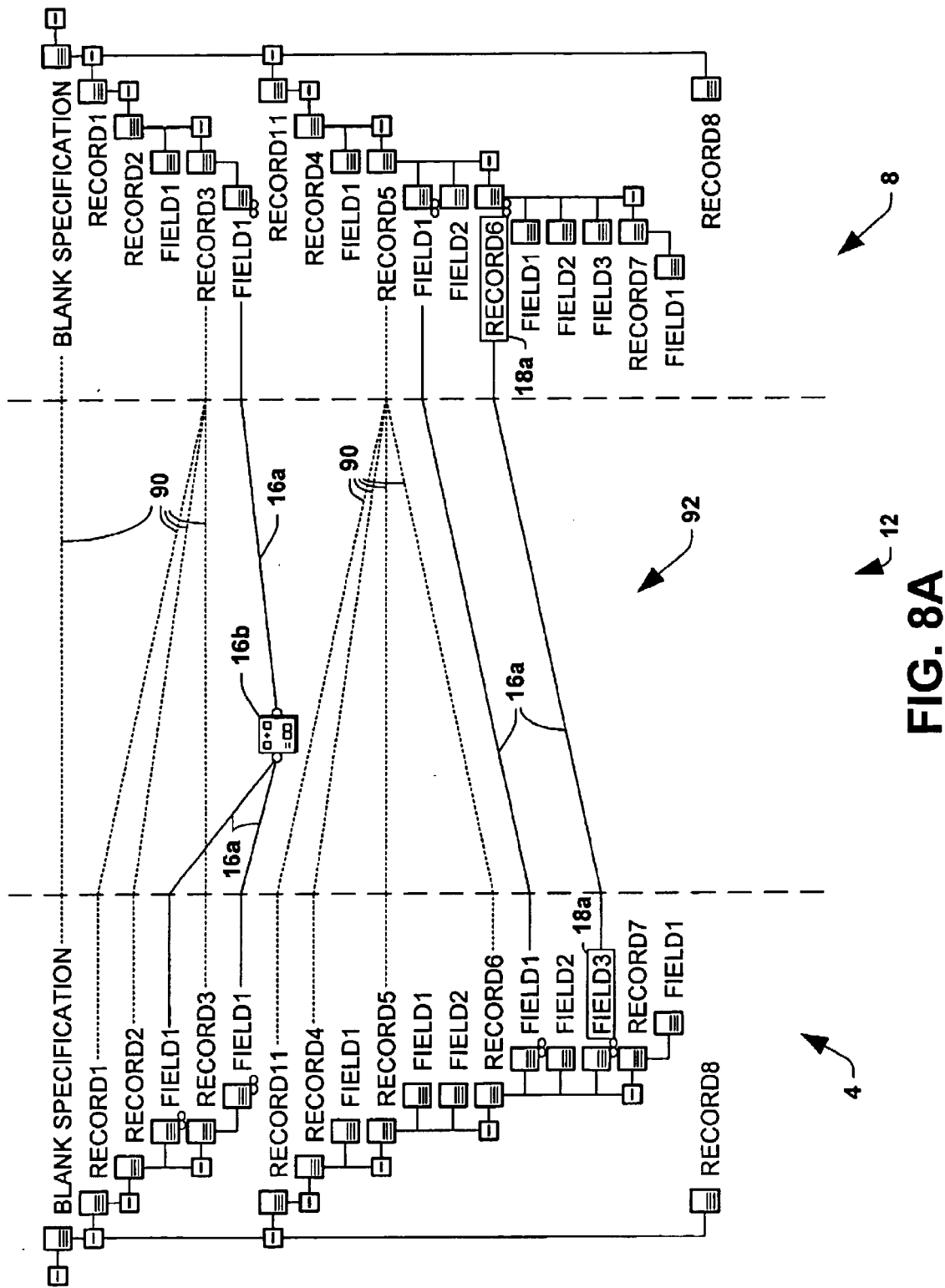
FIG. 8A is a front elevation view illustrating another exemplary user interface having compiler links and compiler link indicia according to the invention.

Referring now to FIG. 8A, a user interface according to the invention is illustrated having compiler links 90 together with user defined links 16a and a function object 16b in the mapping screen region 12. The compiler links 90 are graphically represented using compiler link indicia, for example dashed lines. The compiler links 90 are generated by a compiler (not shown), used to generate output code according to the mapping 92 in the mapping screen region 12. The compiler may perform hierarchy matching using one of flattening, top-down, and bottom-up methodologies. The hierarchy matching algorithm employed by the compiler for particular user-defined links 16a may be a parameter associated with such links. As such, a user may select a particular link 16a and modify the compiler directive property of such link via the link properties page (e.g., as described above). Thus, a user may generate compiler links 90 using a compiler (not shown), and thereafter modify compiler directive properties associated with particular user defined links 16a. In addition, a user may modify the compiler links 90 by selecting them using a user interface selection device (e.g., a mouse) and guiding them to other tree nodes as desired. The compiler will then take this user feedback and thereafter generate output code using the user modified compiler links 90.

Figure 8C:
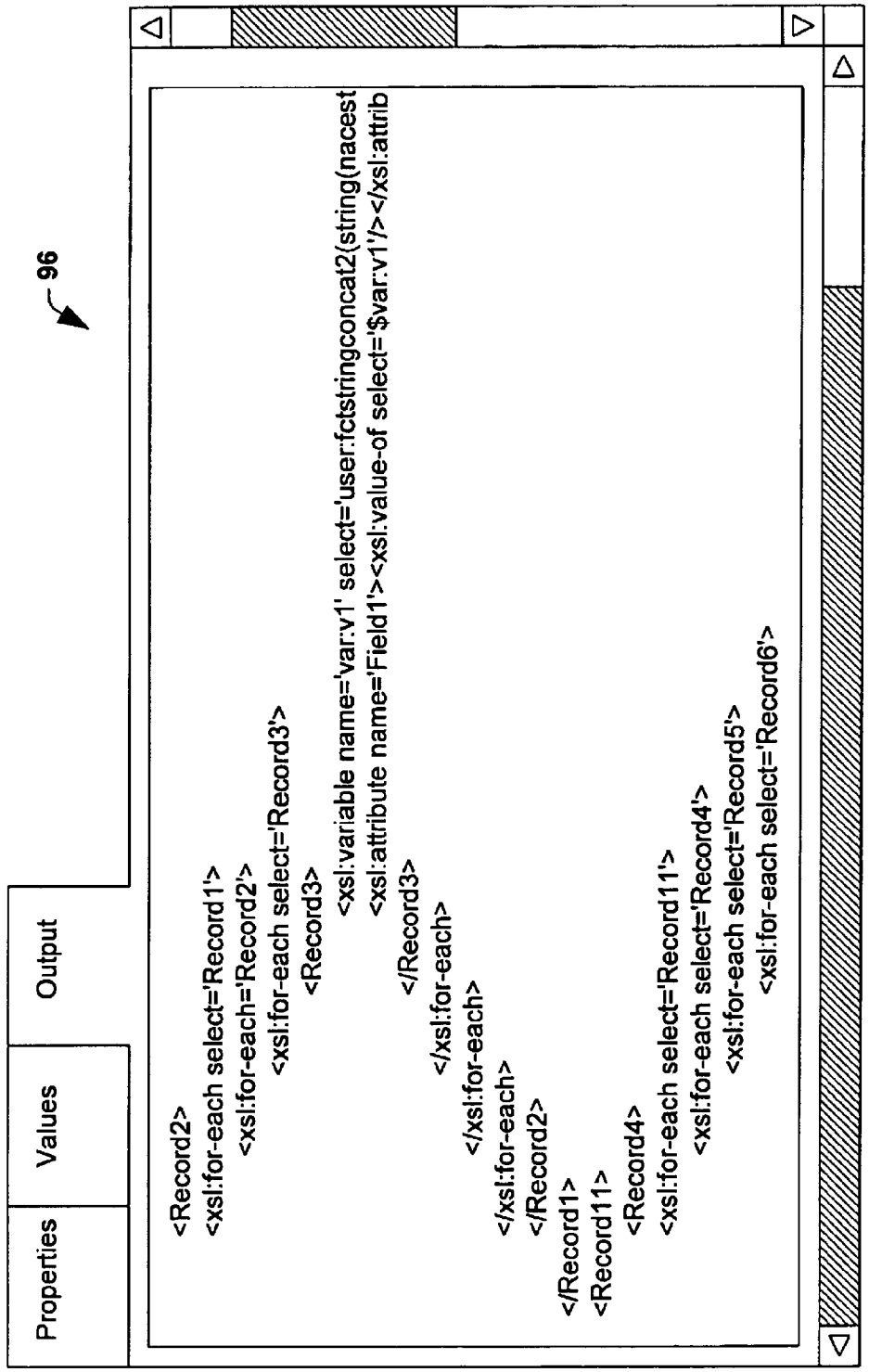
FIG. 8C is a front elevation view illustrating an exemplary output code screen according to the invention.

Referring also to FIGS. 8B and 8C, the graphical user interface may further comprise an output code screen region 94 in which an output code screen 96 may be displayed. In the exemplary output code screen 96 of FIG. 8C, a portion of XSL output code compiled from the exemplary mapping 92 in the mapping screen region 12 of FIG. 8A is illustrated. The output code screen 96 allows the user to immediately review the results of the mapping compilation. Based on this output code, the user may selectively modify compiler directives by selecting appropriate user defined links 16a, and/or select and redirect compiler links 90 via a user interface selection device. The interface thus provides an easy to use graphical environment in which object translation mappings may be created and customized. As described in greater detail with respect to FIGS. 11A and 11B infra, the output code screen 96 may further indicate compiler errors or warnings which may be selected by a user to thereby graphically indicate in the mapping screen region 12, function objects 16b and/or links 16a associated with the particular warning.

Figure 9A:
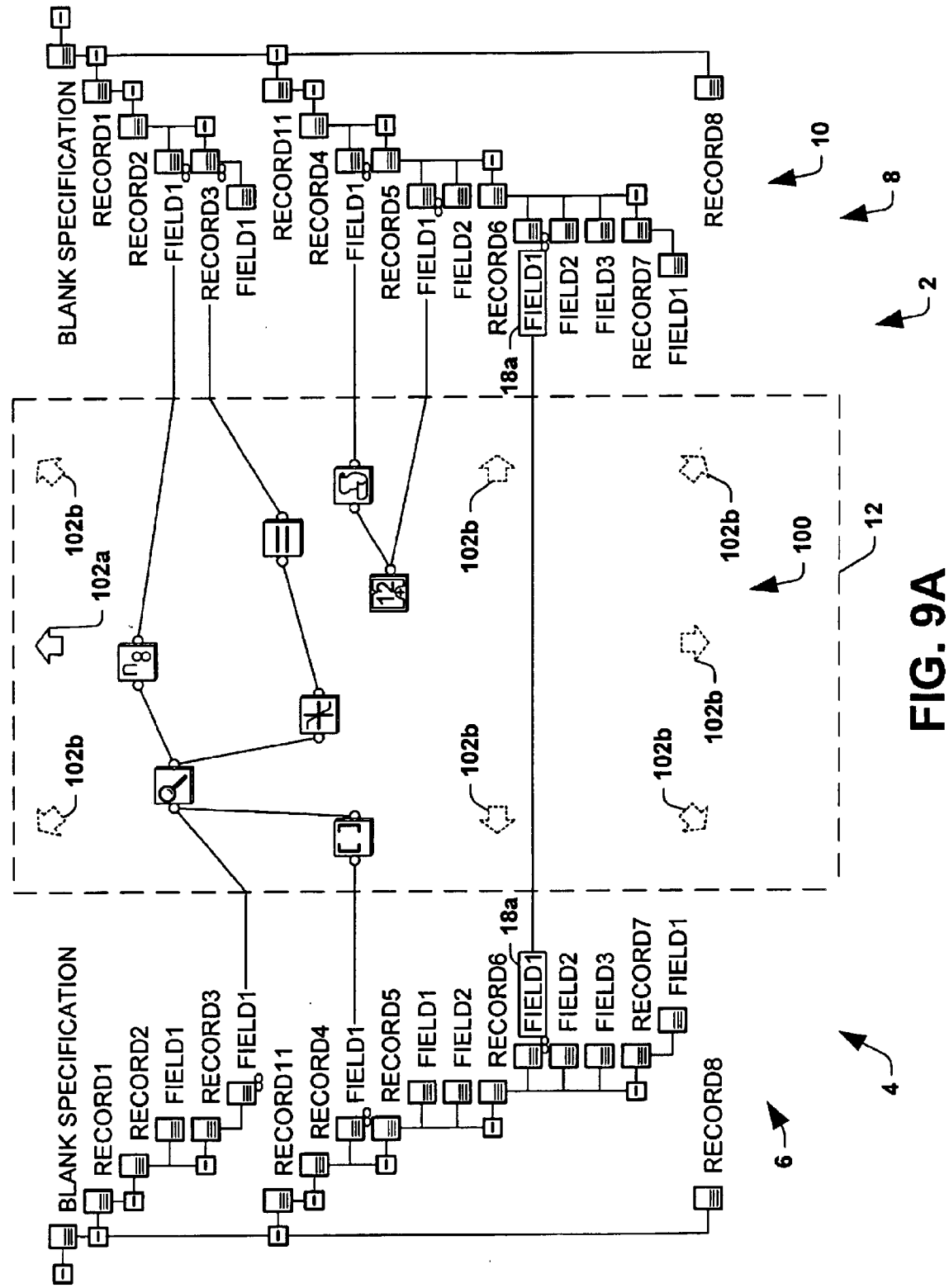
FIG. 9A is a front elevation view illustrating another user interface having exemplary scrolling indicia in a mapping screen region according to the invention.

In FIG. 9A, another exemplary mapping 100 is illustrated in the mapping screen region 12 of the user interface 2. One or more scrolling indicia 102 are provided, which are adapted to allow the user to selectively display portions of the mapping 100 in the mapping screen region 12. It will be appreciated that the user interface 2 may be employed in applications requiring large and complex mappings, such as will not easily by displayed in the region 12. In such cases, only a portion of the mapping 100 will be displayed in region 12. The scrolling indicia 102 allows the user to selectively display various portions of the mapping 100 in region 12. Accordingly, the mapping screen region 12 may include an outer perimeter (shown as dashed line 12 in FIG. 9A).

The mapping screen region 12 may display the scrolling indicia 102 when the user moves a user interface selection device (not shown) near the outer perimeter 12. The scrolling indicia 102 may be further adapted to indicate a direction in which scrolling is possible. In addition, the region 12 may accordingly be adapted to scroll the portion of mapping 100 displayed in region 12 in the direction indicated by the scrolling indicia 102 when the user selects the scrolling indicia 102 using the user interface selection device. For example, a user may move the user interface selection device towards the top of the mapping screen region 12. At that point, a mapping indicia 102a, having an arrow shape pointing in the up direction may be displayed at the top portion of region 12, as illustrated in FIG. 9A. If the user then selects the indicia 102a using the user interface selection device, the mapping display may be scrolled upward in the direction indicated by indicia 102a, thereby selectively displaying a portion of the mapping 100 in the region 12. Other directional arrow indicia 102b (illustrated in dashed lines in FIG. 9A) may also be displayed according to where the user places the user interface selection device at any given time.

Figure 9B:
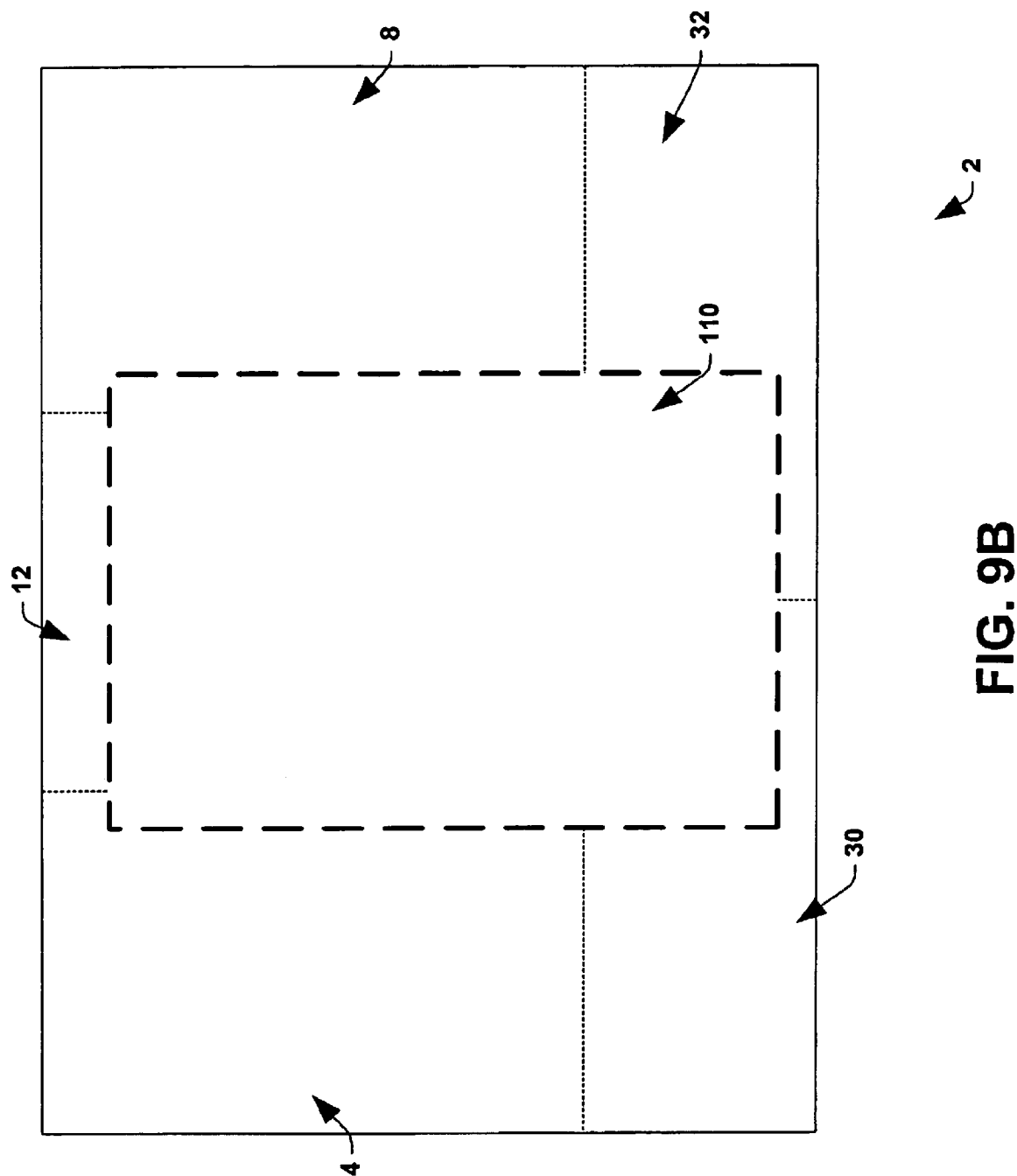
FIG. 9B is a front elevation view illustrating another exemplary user interface having a mapping preview page region according to the invention.
Figure 9C:
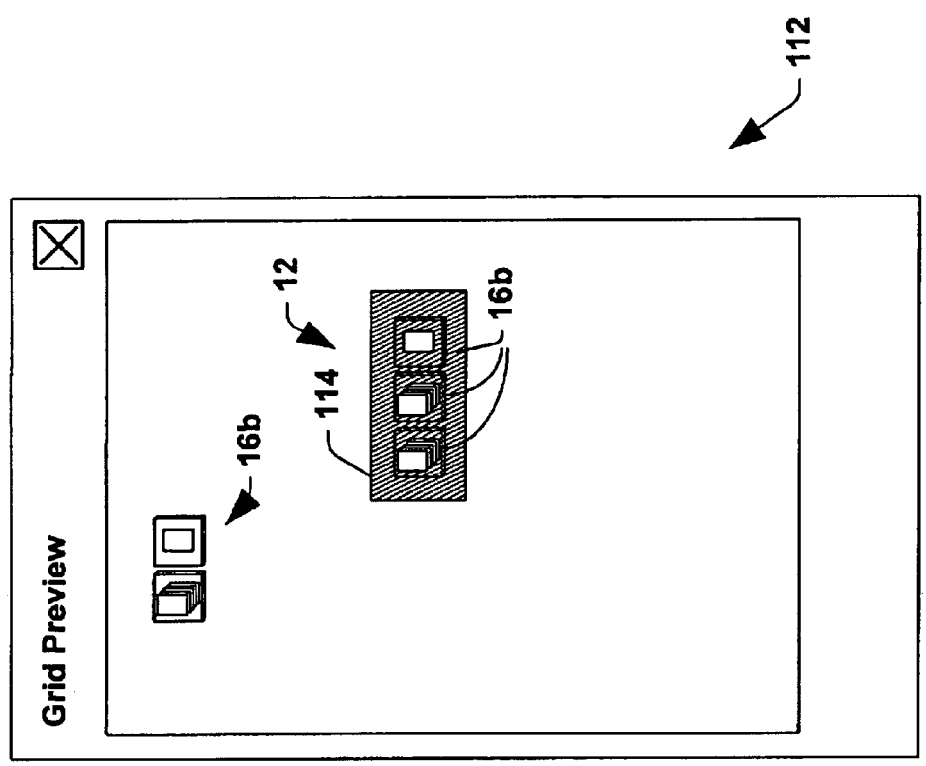
FIG. 9C is a front elevation view illustrating an exemplary mapping preview page according to the invention.

Referring also to FIGS. 9B and 9C, the user interface 2 may further comprise a mapping preview page region 110 in which a mapping preview screen or page 112 may be displayed. The mapping preview page 112 is adapted to display the entire mapping (e.g., mapping 100 of FIG. 9A) in the region 110. The page 112 thus allows the user to identify where function objects 16b are located in cases where the translation map 100 is highly complicated. In addition, the page 112 may further comprise a current region indicia 114 (illustrated as a box in FIG. 9C) adapted to indicate the portion of the mapping 100 currently being displayed in the mapping screen region 12. The user may select or move the current region indicia 114 within the mapping preview page region 110 to thereby change the portion of the mapping 100 currently displayed in the mapping screen region 12 accordingly. The selection and movement of the current region indicia 114 may be accomplished via a user interface selection device.

Figure 9D:
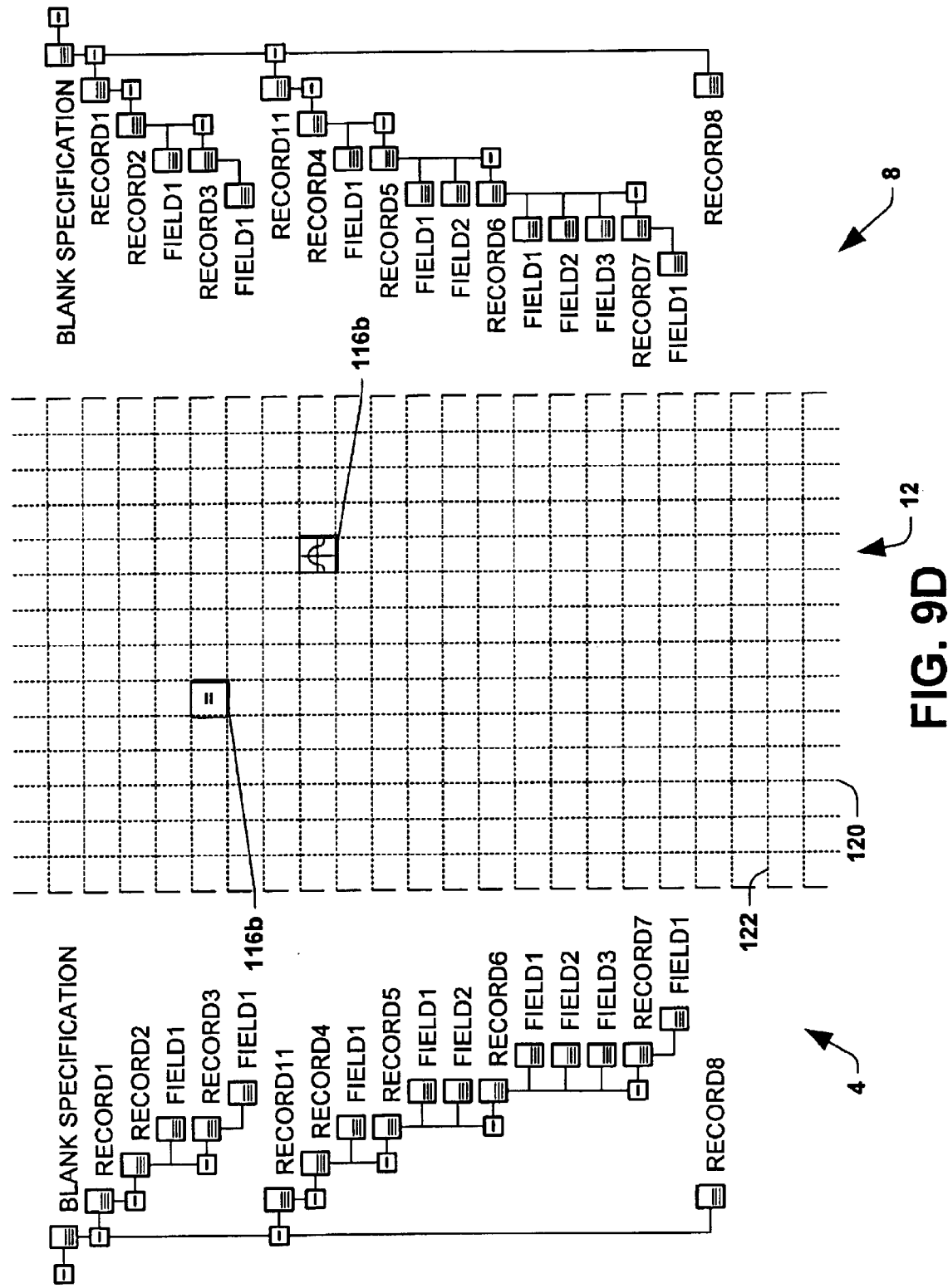
FIG. 9D is a front elevation view illustrating another exemplary user interface having a grid style mapping screen region according to the invention.
Figure 9E:
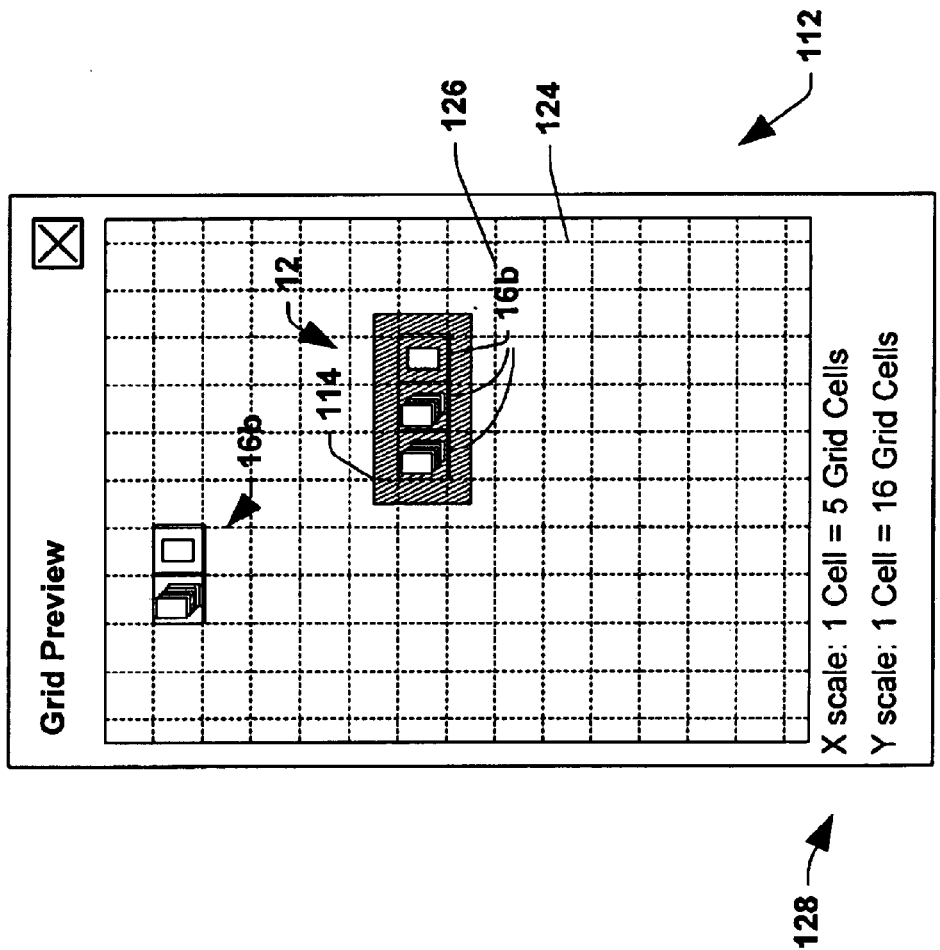
FIG. 9E is a front elevation view illustrating another exemplary mapping preview page having a grid style graphical representation according to the invention.

Referring also to FIGS. 9D and 9E, the mapping screen region 12 may be provided with vertical and horizontal grid lines 120 and 122, respectively, providing for orderly placement of function objects 116b in region 12 as indicated in FIG. 9D. Likewise, the mapping preview page 112 of FIG. 9E may be provided with vertical and horizontal grid line indicia 124 and 126, respectively. Corresponding X and Y scale magnification indicia 128 may be indicated on the mapping preview page 112 to indicate the relative size of the portion of the map 100 displayed in the mapping screen region 12 and the size of the entire map 100.

Figure 10A:
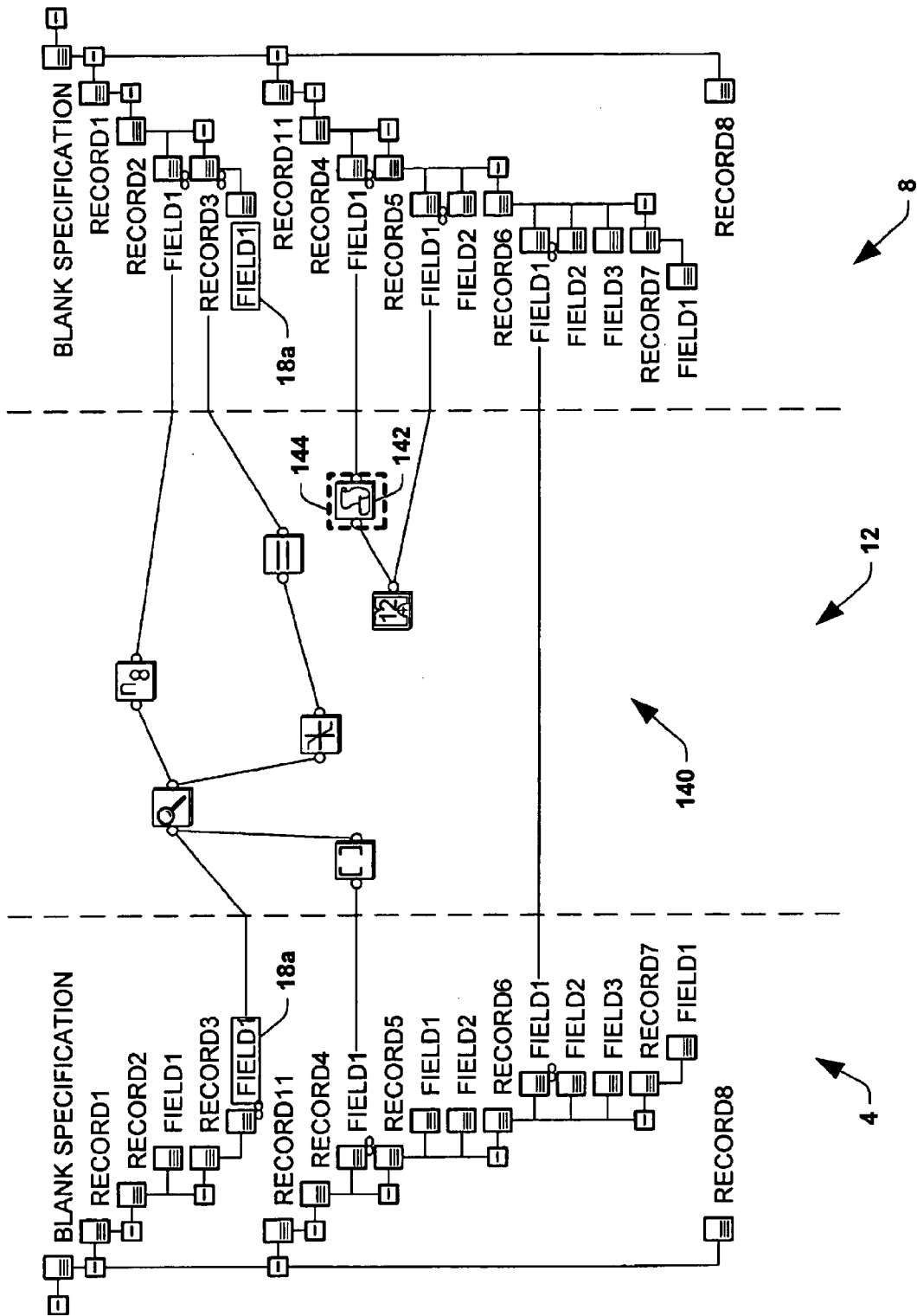
FIG. 10A is a front elevation view illustrating another exemplary user interface having a single selected function object and associated function object selection indicia according to the invention.
Figure 10B:
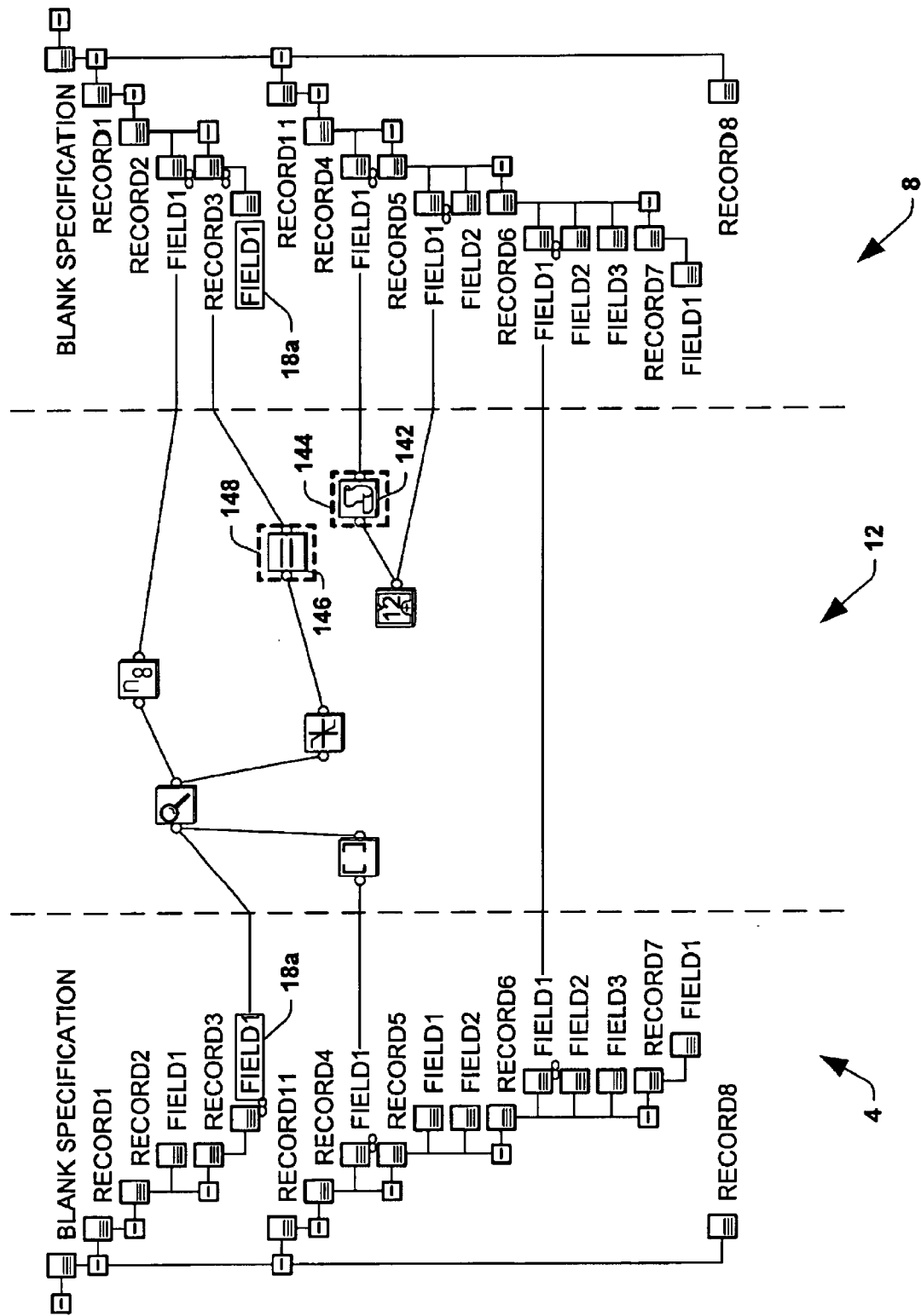
FIG. 10B is a front elevation view illustrating the user interface of FIG. 10A with a plurality of selected function objects and associated function object selection indicia according to the invention.

Referring now to FIGS. 10A through 10D, the user interface may further be adapted to allow a user to select a plurality of function objects. In FIG. 10A, an exemplary mapping 140 is illustrated in the mapping screen region 12 in which a user has selected a function object 142 via a user interface selection device (e.g., a mouse). An exemplary function object selection indicia 144 is displayed in the region 12 to indicate that the function object 142 has been so selected. Referring also to FIG. 10B, if a user subsequently selects another function object 146, another function object selection indicia 148 is displayed in the region 12. The selection indicia 144 and 148 may be simultaneously displayed to thereby indicate that both function objects 142 and 146 are selected.

Figure 10C:
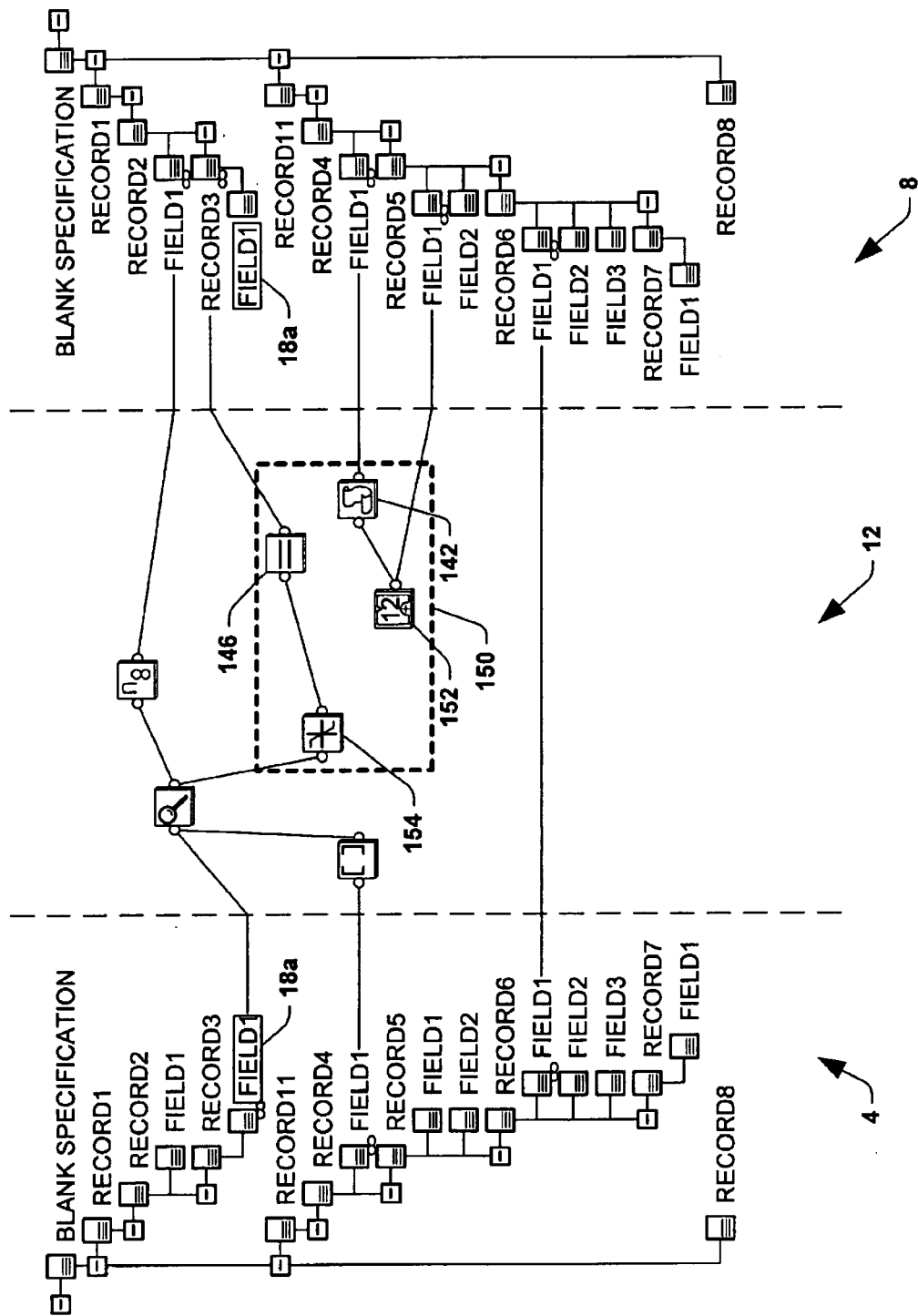
FIG. 10C is a front elevation view illustrating the user interface of FIGS. 10A and 10B with a plurality of function objects being selected as a group according to the invention.
Figure 10D:
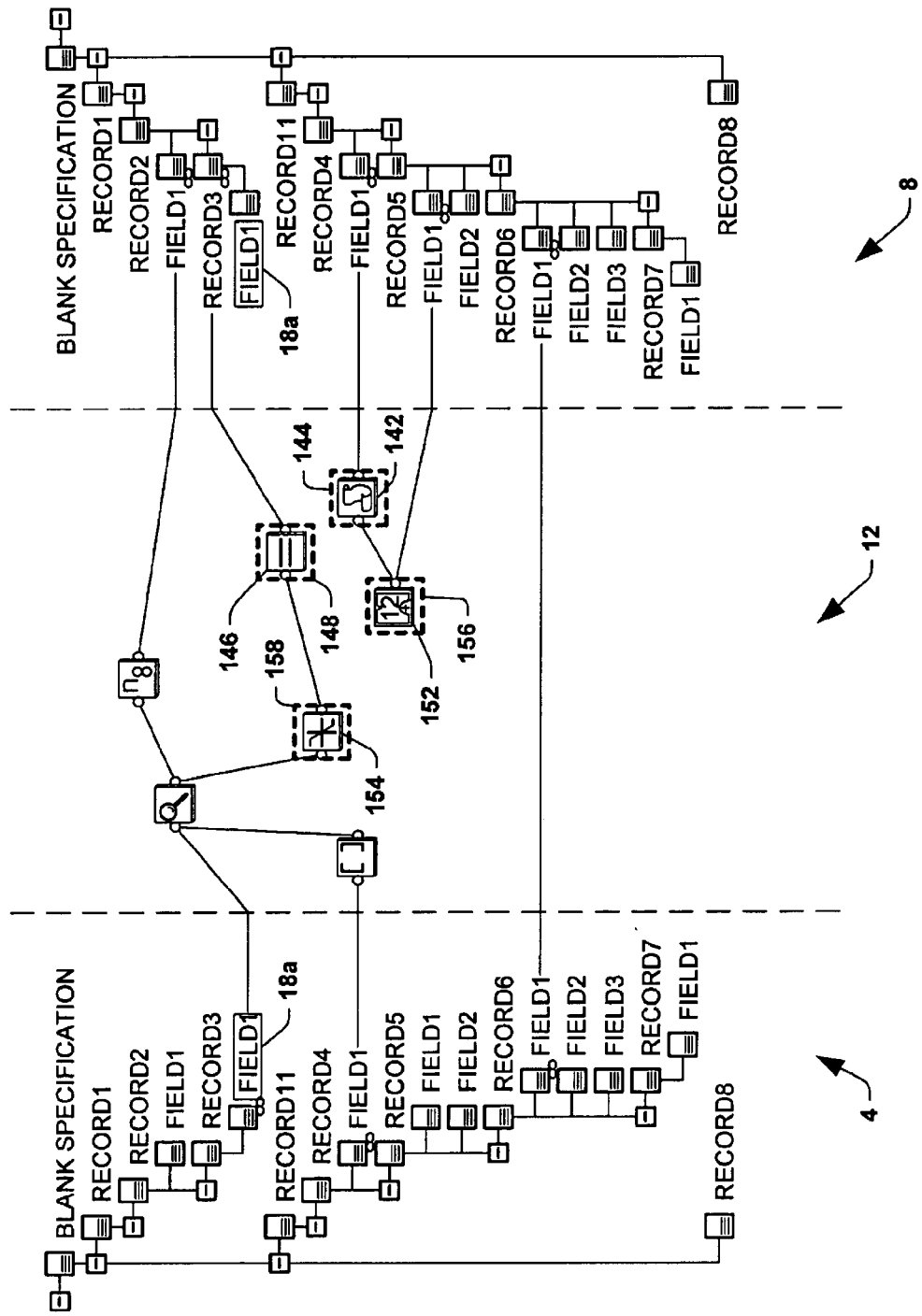
FIG. 10D is a front elevation view illustrating the user interface of FIGS. 10A through 10C with a group of selected function objects and associated function object selection indicia according to the invention.

Multiple selection of mapping indicia (e.g., links as well as function objects) enables a user to perform a particular operation on a group or plurality of such indicia. For example, a user may press a control button on computer keyboard and thereafter select the indicia 142 and 146 to accomplish the selection of both function objects. Referring also to FIG. 10C, a plurality of function objects may also be selected using a rectangular box 150, which may be created using a mouse or other user interface selection device. In the illustrated example, a user has created the box 150, which graphically includes function objects 142, 146, 152, and 154. As illustrated in FIG. 10D, the selection of function objects 142, 146, 152, and 154, using the box 150 of FIG. 10C causes selection indicia 144, 148, 156, and 158, respectively, to be displayed in the mapping screen region 12. A user may then perform operations such as deletions and moving on all of the selected function objects 142, 146, 152, and 154.

Figure 11A:
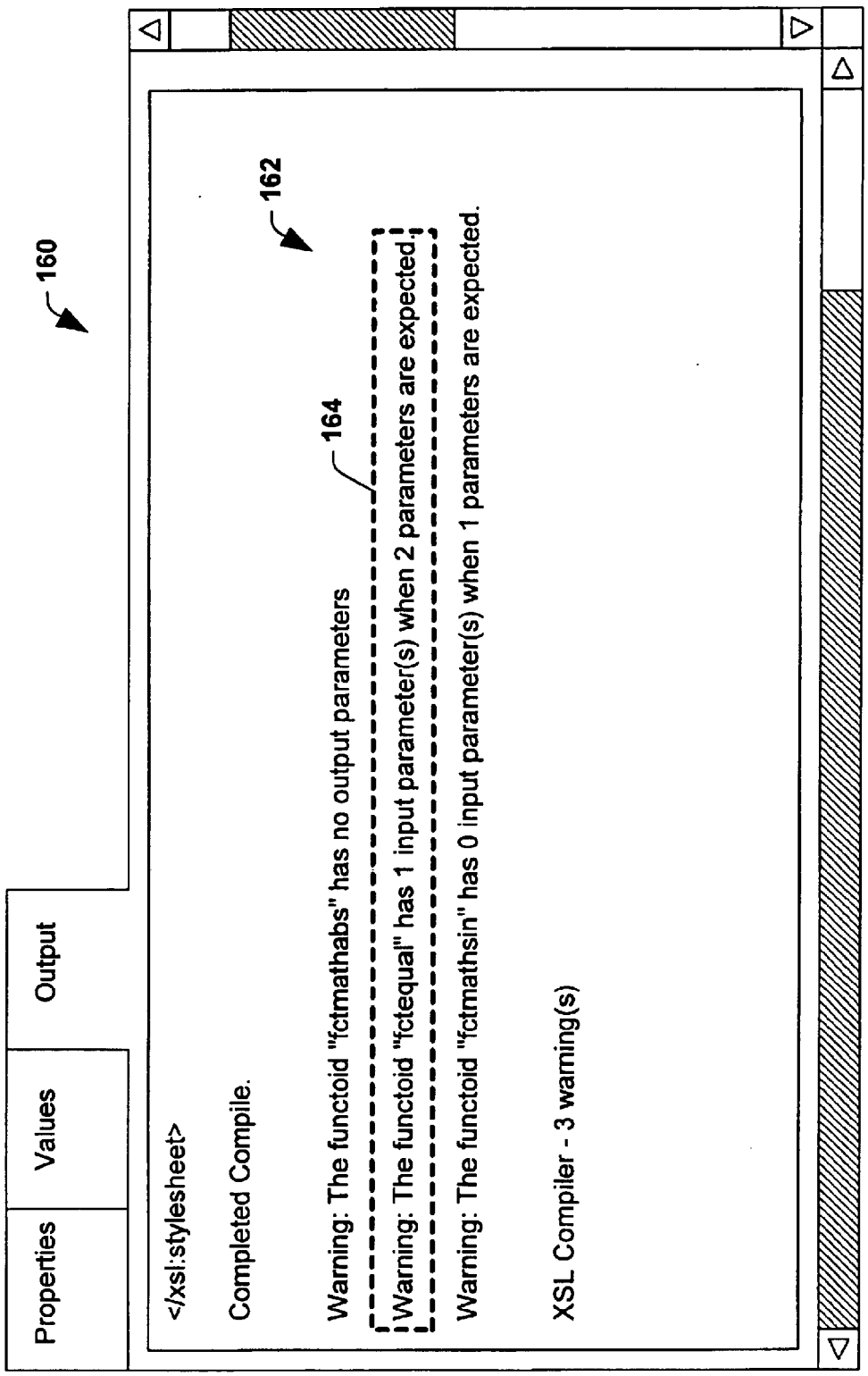
FIG. 11A is a front elevation view illustrating another exemplary output code screen with a compiler warning according to the invention.
Figure 11B:
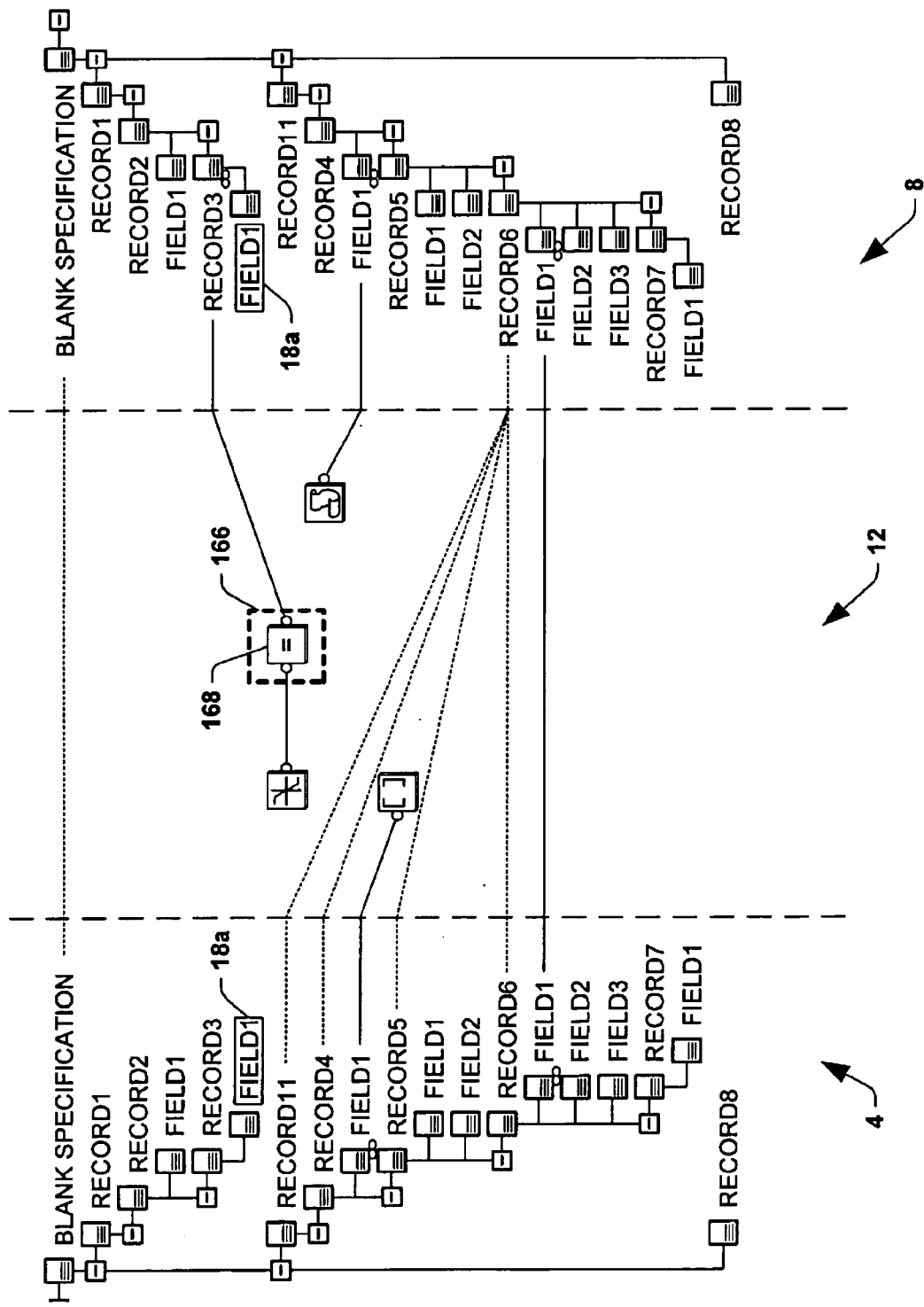
FIG. 11B is a front elevation view illustrating another exemplary user interface with a selected function object associated with the compiler warning of FIG. 11A.

Referring now to FIGS. 11A and 11B, another exemplary output screen 160 is illustrated. As discussed previously with respect to FIGS. 8A-8C the output code screen 160 may be displayed in an output screen region 94 as illustrated in FIG. 8B. The screen 160 may display compiled output code or script as illustrated in FIG. 8C where no compiler errors or warnings have occurred. As illustrated in FIG. 11A, where one or more compiler errors or warnings 162 occur, the screen 160 may display the warnings 162 in the region 94. Using a user interface selection device, the user may highlight or select a particular compiler warning 164. According to another aspect of the invention, the selection of the compiler warning 164 causes the display of a function object selection indicia 166 in FIG. 11B to indicate selection of a function object 168 associated with the compiler warning 164. For example, the selection indicia 166 may be of a different color than the normal function object selection indicia (e.g., indicia 144, 148, 156, and 158 of FIG. 10D). This allows the user to easily identify the function object 168 associated with the compiler warning 164.

Figure 12A:
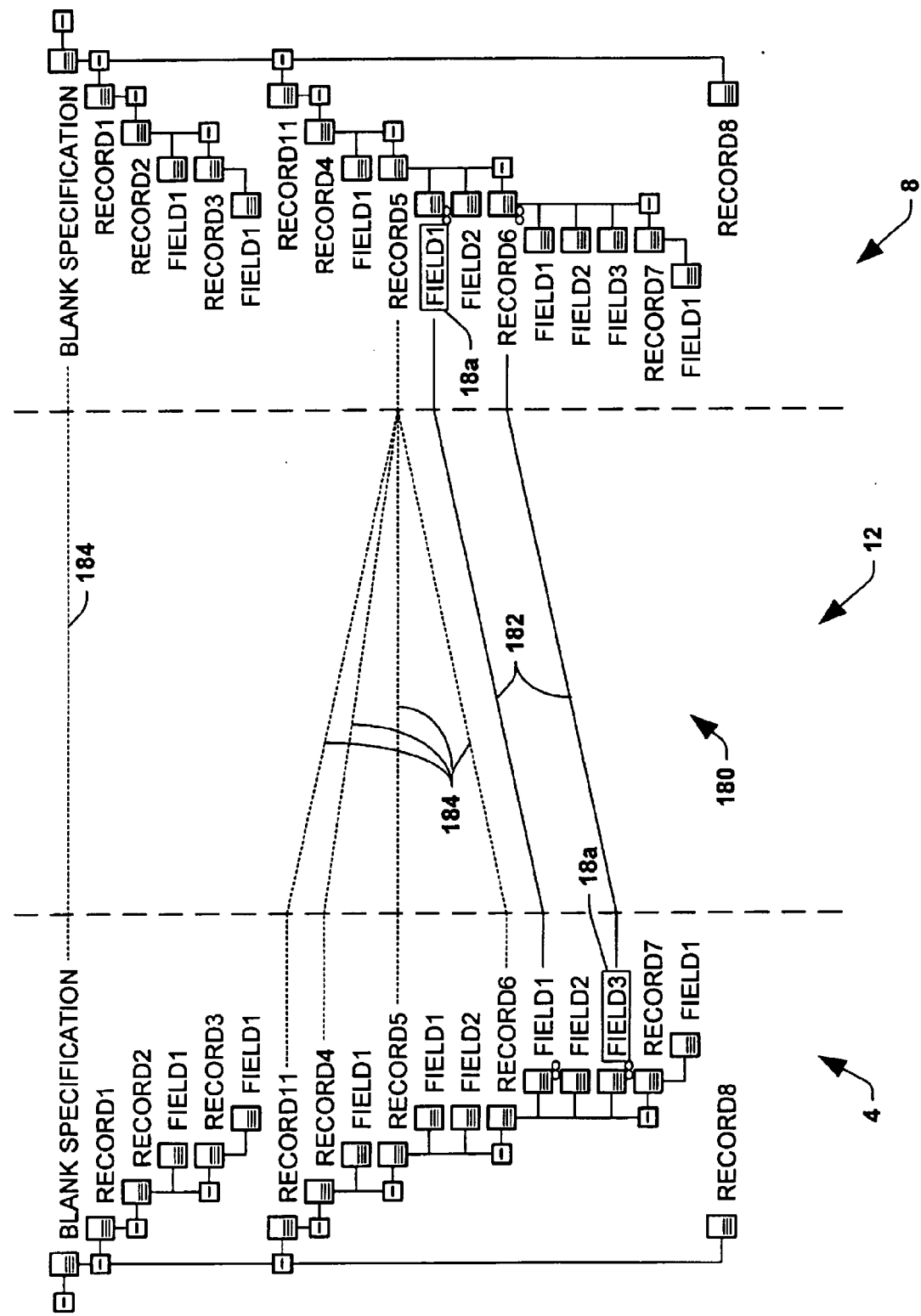
FIG. 12A is a front elevation view illustrating another exemplary user interface with compiler links and compiler link indicia according to the invention.
Figure 12B:
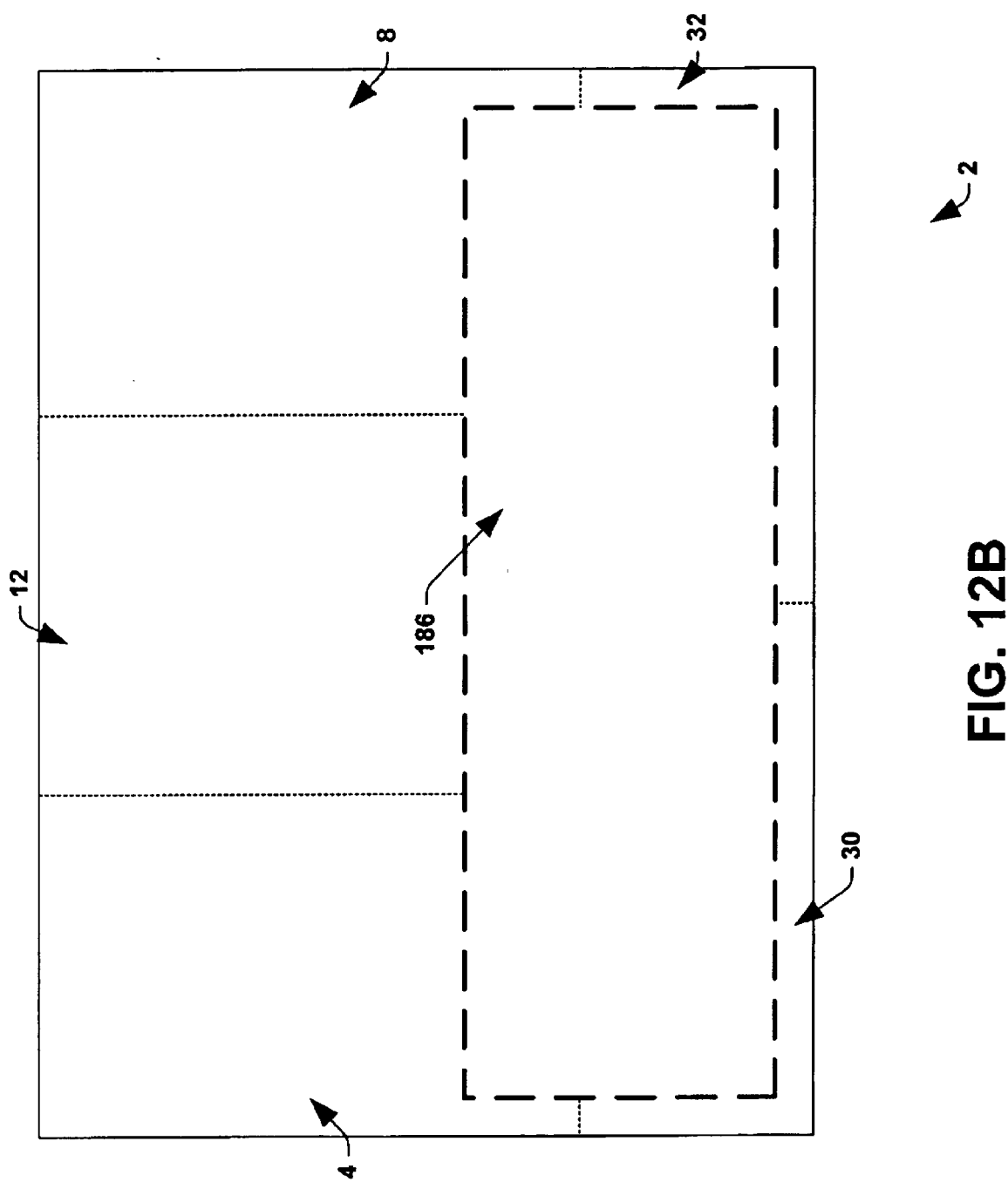
FIG. 12B is a front elevation view illustrating another exemplary user interface having a test screen region according to the invention.
Figure 12C:
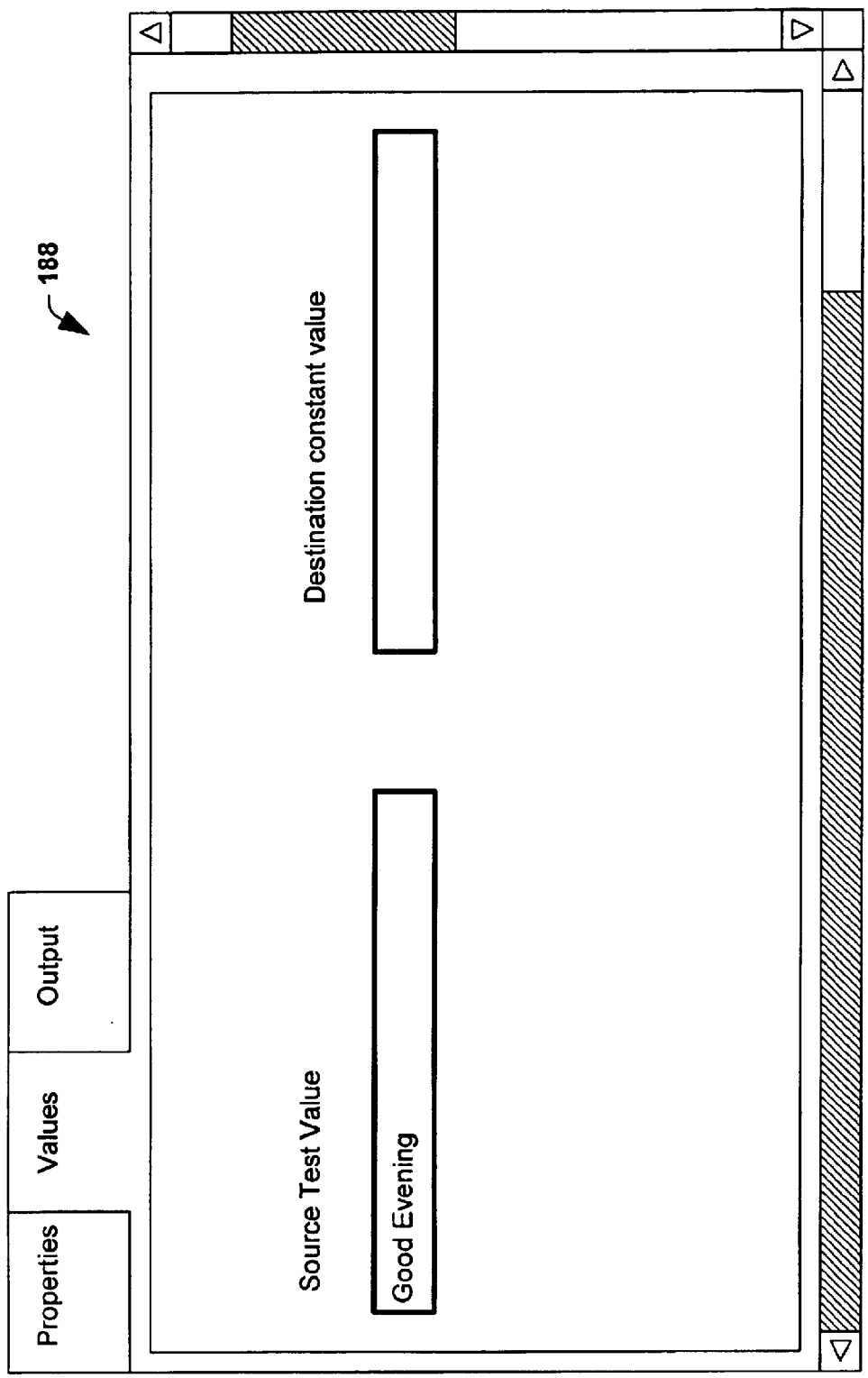
FIG. 12C is a front elevation view illustrating an exemplary test value page according to the invention.

Referring now to FIGS. 12A-12D, the invention further comprises a test or simulation environment in which a user may test the document translation mapping 180 generated by the compiler (not shown). After compilation, the mapping screen region 12 includes a display of user defined links 182 as well as compiler generated links 184. Referring also to FIGS. 12B and 12C, the user interface 2 may further comprise a test screen region 186 adapted to display a test target object instance in a test value page 188. In the test value page 188, a user may associate a constant value (e.g., text "Good Evening") with a node (not shown) in the source object of the source object screen region 4. In addition, a user may associate a constant value (not shown) with a selected node in the target object of region 8.

Figure 12D:
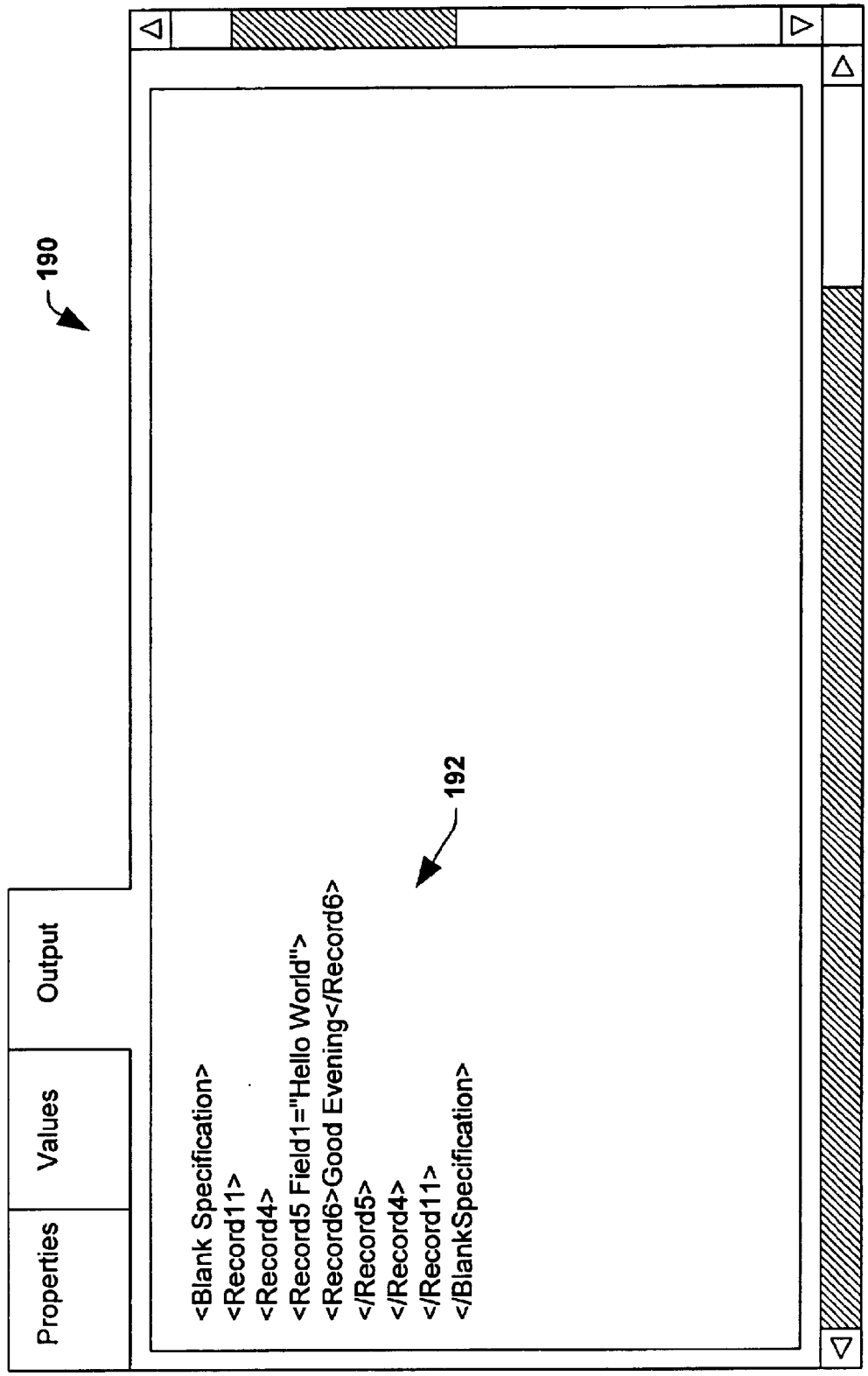
FIG. 12D is a front elevation view illustrating an exemplary test output page according to the invention.

Referring also to FIG. 12D, the user may also display a test output page 190 in the region 186 which is adapted to display the test target object instance 192 resulting from compiled mapping 180 as well as any constant values associated by the user with the source and target objects of regions 4 and 8. The user may view the output page 190 and the output instance 192, and based on the output, the user may modify the document translation mapping 180 by modifying the graphical mapping indicia in region 12.

Figure 13:
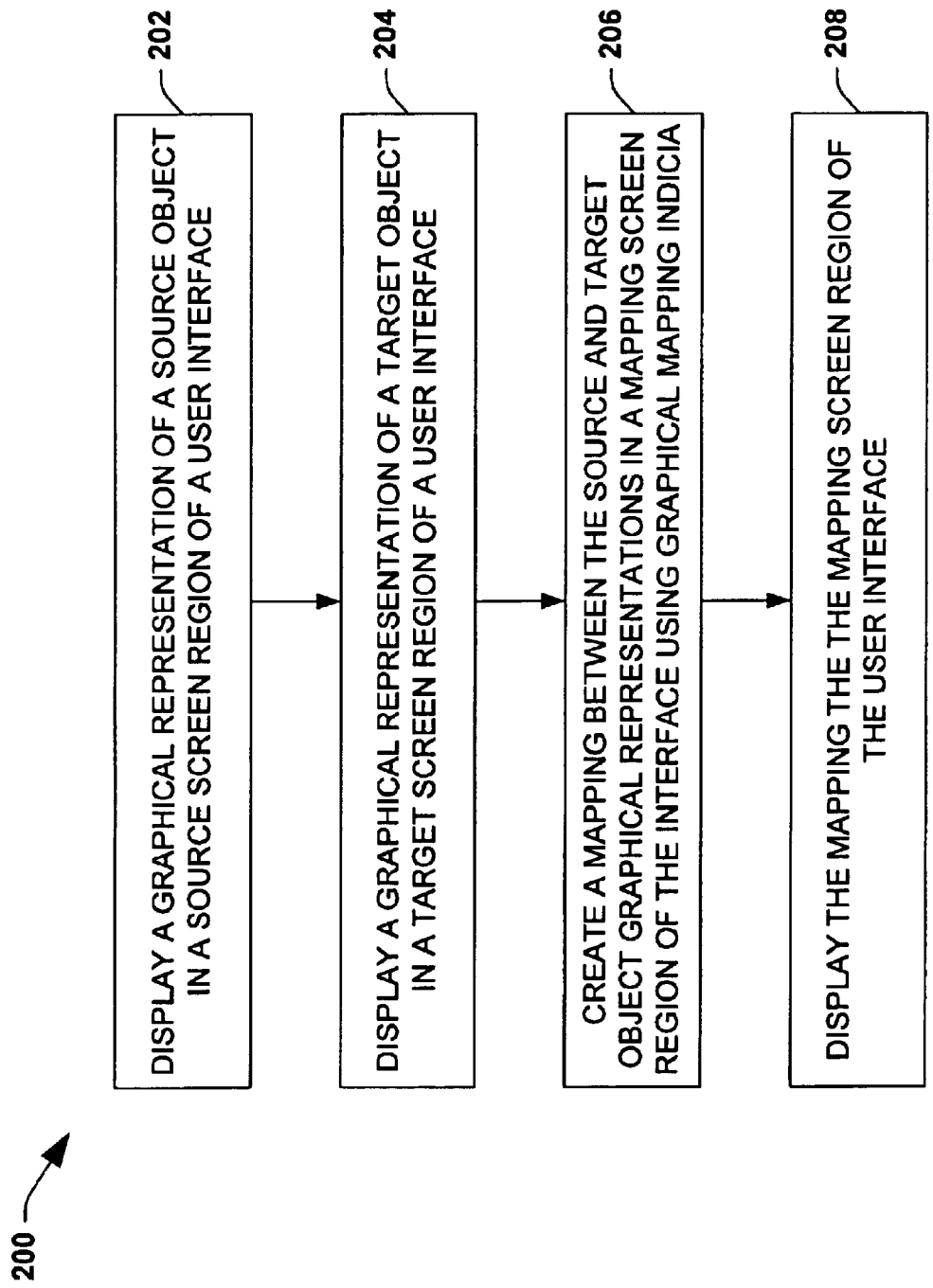
FIG. 13 is a flow diagram illustrating an exemplary method of creating a mapping in a mapping tool graphical user interface according to another aspect of the invention.

Referring now to FIG. 13, an exemplary method 200 of creating a mapping in a mapping tool graphical user interface is illustrated according to another aspect of the invention. Beginning at step 202, a graphical representation of a source object is displayed in a source screen region (e.g. region 4 of FIG. 1). At step 204, a graphical representation of a target object is displayed in a target screen region of a user interface (e.g., region 8). Thereafter in step 206, a mapping (e.g., mapping 14 of FIG. 1) is created between the source and target object graphical representations in a mapping screen region of the user interface (e.g., region 12) using graphical mapping indicia (e.g., indicia 16a and 16b). At step 208, the mapping is displayed the mapping screen region of the user interface. It will be appreciated that while the method 200 of FIG. 13 may be implemented in the various systems and graphical user interfaces illustrated herein, the method 200 may be implemented in other systems.

Exemplary Operating Environment

Figure 14:
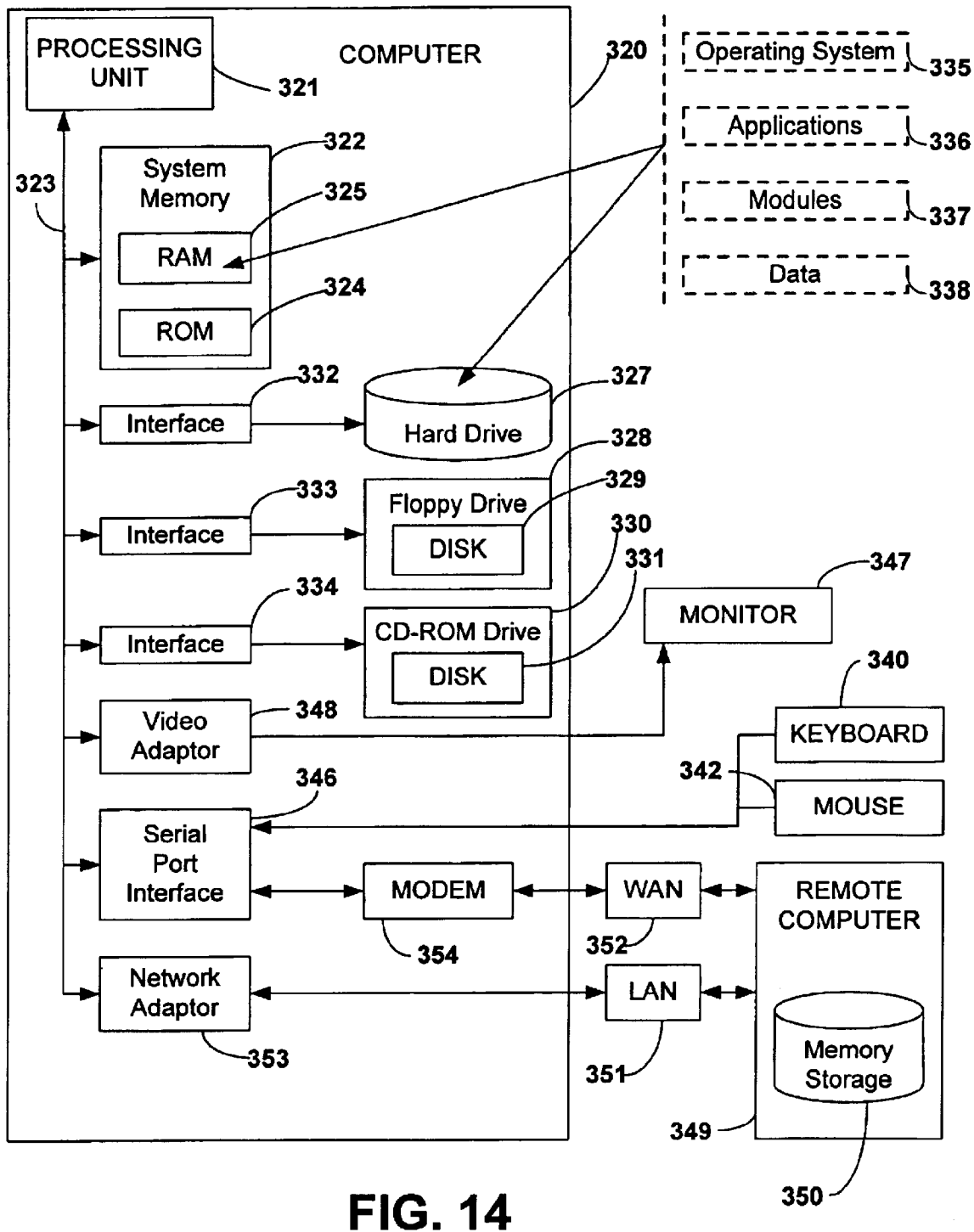
FIG. 14 is a schematic diagram illustrating an exemplary operating environment in which the invention may be implemented.

In order to provide a context for the various aspects of the invention, FIG. 14 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary system for implementing the various aspects of the invention includes a conventional server computer 320, including a processing unit 321, a system memory 322, and a system bus 323 that couples various system components including the system memory to the processing unit 321. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 321.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 324 and random access memory (RAM) 325. A basic input/output system (BIOS), containing the basic routines that help to transfer information between elements within the server computer 320, such as during start-up, is stored in ROM 324.

The server computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the server computer 320. Although the description of computer-readable media above refers to a hard disk, a removable magnetic disk and a CD, it will be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 525, including an operating system 335, one or more application programs 536, other program modules 337, and program data 338. The operating system 335 in the illustrated computer may be the Microsoft Windows 2000 Server operating system, together with the before mentioned Microsoft Transaction Server.

A user may enter commands and information into the server computer 320 through a keyboard 340 and a pointing device, such as a mouse 342. Other input devices (not shown) may include a microphone, a joystick, a game pad, a satellite dish, a scanner, or the like. These and other input devices are often connected to the processing unit 321 through a serial port interface 346 that is coupled to the system bus, but may be connected by other interfaces, such as a parallel port, a game port or a universal serial bus (USB). A monitor 347 or other type of display device is also connected to the system bus 323 via an interface, such as a video adapter 348. In addition to the monitor, computers typically include other peripheral output devices (not shown), such as speakers and printers.

The server computer 320 may operate in a networked environment using logical connections to one or more remote computers, such as a remote client computer 349. The remote computer 349 may be a workstation, a server computer, a router, a peer device or other common network node, and typically includes many or all of the elements described relative to the server computer 320, although only a memory storage device 350 is illustrated in FIG. 14. The logical connections depicted in FIG. 14 include a local area network (LAN) 351 and a wide area network (WAN) 352. Such networking environments are commonplace in offices, enterprise-wide computer networks, intranets and the Internet.

When used in a LAN networking environment, the server computer 320 is connected to the local network 351 through a network interface or adapter 353. When used in a WAN networking environment, the server computer 320 typically includes a modem 354, or is connected to a communications server on the LAN, or has other means for establishing communications over the wide area network 352, such as the Internet. The modem 354, which may be internal or external, is connected to the system bus 323 via the serial port interface 346. In a networked environment, program modules depicted relative to the server computer 320, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 320, unless otherwise indicated.

Such acts and operations are sometimes referred to as being computer-executed. It will be appreciated that the acts and symbolically represented operations include the manipulation by the processing unit 321 of electrical signals representing data bits which causes a resulting transformation or reduction of the electrical signal representation, and the maintenance of data bits at memory locations in the memory system (including the system memory 322, hard drive 327, floppy disks 329, and CD-ROM 331) to thereby reconfigure or otherwise alter the computer system's operation, as well as other processing of signals. The memory locations where such data bits are maintained are physical locations that have particular electrical, magnetic, or optical properties corresponding to the data bits.

Although the invention has been shown and described with respect to a certain implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary implementations of the invention. In this regard, it will also be recognized that the invention includes a computer-readable medium having computer-executable instructions for performing the steps of the various methods of the invention.

In addition, while a particular feature of the invention may have been disclosed with respect to only one of several aspects or implementations of the invention, such a feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising" and its variants.

What is claimed is:

1. A mapping tool graphical user interface, comprising:
  a source screen region adapted to display a graphical representation of a source object;
  a target screen region adapted to display a graphical representation of a target object;
  a mapping screen region that has at least one edge adjacent to each of the source screen region and the target screen region, and adapted to allow a user to create a mapping between the graphical representation of the source object and the graphical representation of the target object using graphical mapping indicia;
  a graphical compiler object adapted to allow the user to generate compiled mapping output code using a compiler; and
  an output code screen in an output screen region adapted to display the compiled mapping output code, to display a compiler warning, and to allow the user to select the compiler warning, wherein the mapping region includes a compiler warning indicia adapted to indicate at least one graphical mapping indicia as being associated with the selected compiler warning.

2. The user interface of claim 1, wherein the source and target objects comprise at least one source node and at least one target node respectively, wherein the compiler is adapted to create a compiler link between the at least one source node and the at least one target node, and wherein the mapping screen region further comprises a compiler link indicia associated with the compiler link.

3. The user interface of claim 2, wherein the compiler link indicia comprises a dashed line between the at least one source node and the at least one target node.

4. The user interface of claim 2, wherein the compiler link indicia is adapted to allow the user to select the compiler link indicia and move the compiler link indicia to one of another source node and another target node.

5. A mapping tool graphical user interface, comprising:
a source screen region adapted to display a graphical representation of a source object having a source node;
a target screen region adapted to display a graphical representation of a target object having a target node; and
a mapping screen region, located between the source screen region and the target screen region, and adapted to allow a user to create a mapping between the graphical representation of the source object and the graphical representation of the target object using graphical mapping indicia with a graphical link indicia adapted to associate the target node with the source node, and further adapted to allow a user to select the graphical link indicia and wherein the mapping screen region further comprises a link selection indicia adapted to indicate that the graphical link indicia has been selected; and
a link properties page in a link properties screen region adapted to display a property associated with a link associated with the selected graphical link indicia, and to allow the user to modify the property.

6. The user interface of claim 5, wherein the graphical link indicia comprises a line in the mapping screen region between the target node and the source node.

7. The user interface of claim 5, wherein the graphical mapping indicia further comprises a graphical function object, and wherein the graphical link indicia comprises a line in the mapping screen region between two of the target node, the source node, and the function object.

8. The user interface of claim 7, wherein the mapping screen region is adapted to allow a user to create a link by selecting one of the target node, the source node, and the function object, and selecting another of the target node, the source node, and the function object, and wherein the mapping screen region is further adapted to display a graphical link indicia between the one of the target node, the source node, and the function object, and the another of the target node, the source node, and the function object.

9. The user interface of claim 7, wherein the mapping screen region is adapted to allow a user to move a link by selecting the line near one of the two of the target node, the source node, and the function object, and moving the line to the other of the target node, the source node, and the function object.

10. The user interface of claim 5, wherein the property comprises a compiler directive, and wherein the link properties page is further adapted to allow the user to select one of flattening, top-down, and bottom-up for the compiler directive.

11. The user interface of claim 5,
wherein the source object includes a source tree structure having a source root node, a source record node, and a source field node;
wherein the target object includes a target tree structure having a target root node, a target record node, and a target field node;
wherein the field nodes are indented in hierarchical fashion from the record nodes, and the record nodes are indented in hierarchical fashion from the root nodes;
wherein one of the source object tree structure and the target object tree structure comprises a collapse indicia associated with one of a root node and a record node in the one of the source object tree structure and the target object tree structure;
wherein the collapse indicia is adapted to allow a user to collapse and expand the one of a root node and a record node in a hierarchical fashion, and wherein the one of the source object tree structure and the target object tree structure is displayed in one of a collapsed form and an expanded form according to the collapse indicia; and
wherein the graphical link indicia comprises a collapsed link indicia adapted to indicate the association between the target node and the source node when the one of the source object tree structure and the target object tree structure is displayed in the collapsed form.

12. The user interface of claim 11, wherein the collapsed link indicia is a dashed line.

13. The user interface of claim 11, wherein the mapping screen region is further adapted to allow a user to select the collapsed link indicia, whereby the one of a root node and a record node is expanded and displayed in expanded form.

14. A mapping tool graphical user interface, comprising:
a source screen region adapted to display a graphical representation of a source object;
a target screen region adapted to display a graphical representation of a target object;
a mapping screen region, positioned to have a common edge with each of the source screen region and the target screen region, and adapted to allow a user to create a mapping between the graphical representation of the source object and the graphical representation of the target object using graphical mapping indicia;
wherein the source and target objects comprise at least one source node and at least one target node respectively, and wherein the graphical mapping indicia comprises a function object adapted to associate the at least one target node with the at least one source node; and
a function object palette screen in a function object palette screen region, wherein the function object palette screen includes a plurality of function objects, and wherein the function object palette screen is adapted to allow a user to drag and drop the function object from the function object palette screen onto the mapping screen region using a user interface selection device.

15. The user interface of claim 14, wherein the function object is associated with script used by a compiler to generate compiled mapping output code.

16. The user interface of claim 14, further adapted to allow a user to select the function object, wherein the mapping screen region further comprises a function object selection indicia adapted to indicate that the function object has been selected.

17. The user interface of claim 16, further comprising a function object properties page in a function object properties page screen region adapted to display a property associated with the selected function object, and further adapted to allow a user to modify the property.

18. The user interface of claim 17, wherein the function object properties page is further adapted to allow the user to enter a constant value in the function object properties page.

19. The user interface of claim 16, further adapted to allow the user to select a plurality of function objects, and wherein the function object selection indicia is further adapted to indicate that the plurality of function objects have been selected.

20. The user interface of claim 19, further adapted to allow the user to select the plurality of function objects by creating a box around the plurality of function objects using a user interface selection device.

21. The user interface of claim 14, wherein the function object is adapted to associate the at least one target node with the at least one source node.

22. The user interface of claim 21, wherein the function object is a user function object is associated with user script used by a compiler to generate compiled mapping output code, and wherein the mapping screen region further comprises a function object creation interface adapted allow the user to create the user script and to associate the user script with the user function object.

23. In a mapping tool graphical user interface, a method of creating a mapping, comprising:
  displaying a graphical representation of a source object including a source tree structure having a source root node, a source record node, and a source field node in a source screen region;
  displaying a graphical representation of a target object including a target tree structure having a target root node, a target record node, and a target field node in a target screen region;
  creating a mapping between the graphical representation of the source object and the graphical representation of the target object in a mapping screen region located between the source and target screen regions using graphical mapping indicia;
  indenting the field nodes toward the mapping screen region in hierarchical fashion from the record nodes; and
  indenting the record nodes toward the mapping screen region in hierarchical fashion from the root nodes.

24. The method of claim 23, further comprising:
  selecting a node in one of the source screen region and the target screen region;
  displaying a node selection indicia adapted to indicate a selected node in one of the source object tree structure and the target object tree structure; and
  displaying a property associated with the selected node in a node properties page in a node properties page screen region;
  modifying the property associated with the selected node in the node properties page.

25. In a mapping tool graphical user interface, a method of creating a mapping, comprising:
  displaying a graphical representation of a source object in a source screen region,
  displaying a graphical representation of a target object in a target screen region;
  creating a mapping between the graphical representation of the source object and the graphical representation of the target object in a mapping screen region located separate from and adjacent to each of the source and target screen regions using graphical mapping indicia;
  displaying the mapping in the mapping screen region;
  displaying a graphical compiler object adapted to allow the user to generate compiled mapping output code using a compiler;
  displaying an output code screen in an output screen region;
  displaying the compiled mapping output code in the output code screen;
  displaying a compiler warning in the output code screen;
  selecting the compiler warning; and
  displaying a compiler warning indicia in the mapping region adapted to indicate at least one graphical mapping indicia as being associated with the selected compiler warning.

26. The method of claim 25, wherein the source and target objects comprise at least one source node and at least one target node respectively, further comprising:
  creating a compiler link between the at least one source node and the at least one target node using the compiler; and
  displaying a compiler link indicia in the mapping screen region associated with the compiler link.

27. The method of claim 26, further comprising:
  selecting the compiler link indicia; and
  moving the compiler link indicia to one of another source node and another target node.

28. In a mapping tool graphical user interface, a method of creating a mapping, comprising:
  displaying a graphical representation of a source object having a source node in a source screen region;
  displaying a graphical representation of a target object having a target node in a target screen region;
  creating a mapping between the graphical representation of the source object and the graphical representation of the target object in a mapping screen region positioned between the source and target screen regions using a graphical link indicia in the mapping screen region adapted to associate the target node with the source node;
  displaying the mapping in the mapping screen region;
  selecting the graphical link indicia;
  displaying a link selection indicia adapted to indicate that the graphical link indicia has been selected;
  displaying a link properties page in a link properties screen region;
  displaying a property associated with a link associated with the selected graphical link indicia in the link properties page; and
  modifying the property.

29. The method of claim 28, wherein the graphical link indicia comprises a line in the mapping screen region between the target node and the source node.

30. The method of claim 28, wherein creating a mapping further comprises displaying a graphical function object, and wherein the graphical link indicia comprises a line in the mapping screen region between two of the target node, the source node, and the function object.

31. The method of claim 30, wherein creating a mapping further comprises:
  creating a link including:
    selecting one of the target node, the source node, and the function object; and
    selecting another of the target node, the source node, and the function object; and
  displaying a graphical link indicia between the one of the target node, the source node, and the function object, and another of the target node, the source node, and the function object.

32. The method of claim 30, further comprising moving a link via:
selecting the line near one of the two of the target node, the source node, and the function object; and
moving the line to the other of the target node, the source node, and the function object.

33. The method of claim 28, wherein the property comprises a compiler directive, and wherein the link properties page is further adapted to allow the user to select one of flattening, top-down, and bottom-up for the compiler directive.

34. In a mapping tool graphical user interface, a method of creating a mapping, comprising:
displaying a graphical representation of a source object with at least one source node in a source screen region;
displaying a graphical representation of a target object with at least one target node in a target screen region;
creating a mapping between the graphical representation of the source object and the graphical representation of the target object in a mapping screen region adjoining both the source and target screen regions using at least one function object adapted to associate the at least one target node with the at least one source node;
displaying the mapping in the mapping screen region;
displaying a function object palette screen in a function object palette screen region, wherein the function object palette screen includes a plurality of function objects; and
allowing a user to drag and drop the at least one function object from the function object palette screen onto the mapping screen region using a user interface selection device.

35. The method of claim 34, further comprising associating the at least one function object with script used by a compiler to generate compiled mapping output code.

36. The method of claim 34, further comprising:
selecting the at least one function object; and
displaying a function object selection indicia adapted to indicate that the at least one function object has been selected.

37. The method of claim 36, further comprising:
displaying a function object properties page in a function object properties page screen region adapted to display a property associated with the selected function object; and
modifying the property.

38. The method of claim 37, further comprising entering a constant value in the function object properties page.

39. The method of claim 36, further comprising selecting a plurality of function objects, wherein the function object selection indicia is further adapted to indicate that the plurality of function objects have been selected.

40. The method of claim 39, further comprising selecting the plurality of function objects by creating a box around the plurality of function objects using a user interface selection device.

41. The method of claim 34, further comprising displaying a user function object adapted to associate the at least one target node with the at least one source node.

42. The method of claim 41, wherein the user function object is associated with user script used by a compiler to generate compiled mapping output code, further comprising:
displaying a function object creation interface in the mapping screen region; and
allowing the user to create the user script and to associate the user script with the user function object.

43. A mapping tool graphical user interface, comprising
means for displaying a graphical representation of a source object in a source screen region, wherein the source object comprises a source tree structure having a source root node, a source record node, and a source field node in the source screen region;
means for displaying a graphical representation of a target object in a target screen region, wherein the target object comprises a target tree structure having a target root node, a target record node, and a target field node in a target screen region;
means for creating a mapping between the graphical representation of the source object and the graphical representation of the target object in a mapping screen region positioned adjacent to each of the source and target screen regions using graphical mapping indicia;
means for displaying the mapping in the mapping screen region;
means for indenting the field nodes toward the mapping screen region in hierarchical fashion from the record nodes; and
means for indenting the record nodes toward the mapping screen region in hierarchical fashion from the root nodes.

44. The mapping tool graphical user interface of claim 43, further comprising means for displaying a graphical compiler object adapted to allow the user to generate compiled mapping output code using a compiler.

45. The mapping tool graphical user interface of claim 43, further comprising:
means for displaying at least a portion of the mapping in the mapping screen region; and
means for displaying a scrolling indicia in the mapping screen region adapted to allow the user to selectively display portions of the mapping in the mapping screen region.

46. The mapping tool graphical user interface of claim 43, further comprising means for displaying a test target object instance according to the mapping in a test screen region.

47. The mapping tool graphical user interface of claim 43, further comprising:
means for replacing one of the source and target objects; and
means for preserving at least a portion of the mapping.

* * * * *